(12) United States Patent
Akanuma

(10) Patent No.: US 11,750,779 B2
(45) Date of Patent: Sep. 5, 2023

(54) LIGHT DEFLECTOR, OPTICAL SCANNING SYSTEM, IMAGE PROJECTION DEVICE, IMAGE FORMING APPARATUS, AND LIDAR DEVICE

(71) Applicant: Ricoh Company, Ltd., Tokyo (JP)

(72) Inventor: Goichi Akanuma, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 365 days.

(21) Appl. No.: 16/994,786

(22) Filed: Aug. 17, 2020

(65) Prior Publication Data

US 2021/0058592 A1  Feb. 25, 2021

(30) Foreign Application Priority Data

Aug. 20, 2019  (JP) .................................. 2019-150467
Jun. 12, 2020  (JP) .................................. 2020-102621

(51) Int. Cl.
| G02B 26/08 | (2006.01) |
| H04N 9/31 | (2006.01) |
| G02B 27/09 | (2006.01) |
| G01S 7/481 | (2006.01) |

(52) U.S. Cl.
CPC ......... *H04N 9/3152* (2013.01); *G01S 7/4816* (2013.01); *G02B 26/0833* (2013.01); *G02B 27/0933* (2013.01); *G02B 27/0944* (2013.01)

(58) Field of Classification Search
CPC .. H04N 9/3152; H04N 9/3129; H04N 9/3141; G01S 7/4816; G01S 7/4817; G02B 26/0833; G02B 27/0933; G02B 27/0944; G02B 26/101; G02B 26/0858
See application file for complete search history.

(56) References Cited

U.S. PATENT DOCUMENTS

| 6,177,667 | B1 | 1/2001 | Fujita et al. |
| 2010/0033685 | A1 | 2/2010 | Seo et al. |
| 2010/0195180 | A1 | 8/2010 | Akanuma et al. |
| 2010/0309536 | A1* | 12/2010 | Akanuma .......... G02B 26/0858 359/200.8 |
| 2012/0120470 | A1 | 5/2012 | Kitazawa et al. |
| 2015/0062683 | A1 | 3/2015 | Akanuma et al. |
| 2015/0077823 | A1 | 3/2015 | Hashiguchi et al. |
| 2015/0349237 | A1* | 12/2015 | Aimono ............. G02B 26/0858 318/116 |

(Continued)

FOREIGN PATENT DOCUMENTS

| JP | 2011-018026 | 1/2011 |
| JP | 2014-066876 | 4/2014 |
| WO | WO2012/111332 A1 | 8/2012 |

*Primary Examiner* — Euncha P Cherry
(74) *Attorney, Agent, or Firm* — XSENSUS LLP

(57) ABSTRACT

A light deflector includes a fixed part, a movable part provided with a reflection plane, a pair of elastic supporting units configured to support the movable part, a pair of connecting parts configured to connect between the pair of elastic supporting units and the fixed part, and a driving unit configured to deform the pair of connecting parts to make the movable part oscillate. The pair of connecting parts are supported by the fixed part in a cantilevered state, and each one of the pair of connecting parts having a folded structure. An optical scanning system includes the light deflector. An image projection device includes the light deflector.

19 Claims, 30 Drawing Sheets

(56) References Cited

U.S. PATENT DOCUMENTS

| | | |
|---|---|---|
| 2016/0109697 A1 | 4/2016 | Nakagawa et al. |
| 2016/0139404 A1 | 5/2016 | Akanuma |
| 2019/0391394 A1 | 12/2019 | Shinkawa et al. |
| 2020/0183151 A1 | 6/2020 | Nanjyo et al. |

* cited by examiner

MODE 1: 8637 Hz

MODE 2: 21019 Hz

MODE 3: 26700 Hz

MODE 1: 12243 Hz

MODE 2: 23632 Hz

MODE 3: 29680 Hz

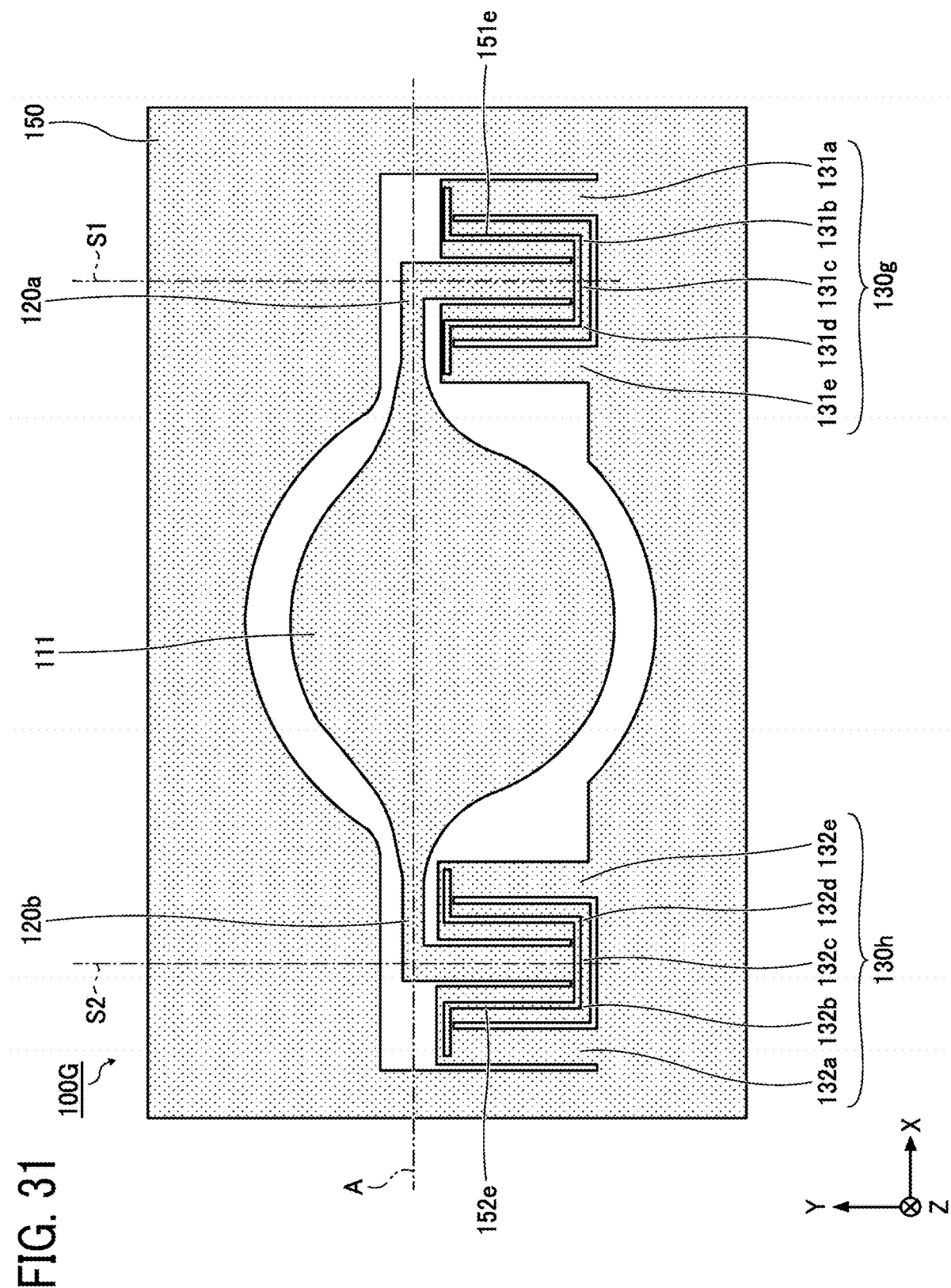

MODE 1: 13991 Hz

MODE 2: 24318 Hz

MODE 3: 36242 Hz

LIGHT DEFLECTOR, OPTICAL SCANNING SYSTEM, IMAGE PROJECTION DEVICE, IMAGE FORMING APPARATUS, AND LIDAR DEVICE

CROSS-REFERENCE TO RELATED APPLICATIONS

This patent application is based on and claims priority pursuant to 35 U.S.C. § 119(a) to Japanese Patent Application Nos. 2019-150467 and 2020-102621, filed on Aug. 20, 2019, and Jun. 12, 2020, respectively, in the Japan Patent Office, the entire disclosures of which are hereby incorporated by reference herein.

BACKGROUND

Technical Field

Embodiments of the present disclosure relate to a light deflector, an optical scanning system, an image projection device, an image forming apparatus, and a LiDAR device.

Background Art

Currently, micromachining technology to which semiconductor manufacturing technology is applied is developed, and the development of a micro-electromechanical systems (MEMS) device as a light-deflector that is manufactured by performing micromachining or fine patterning for silicon or glass is in progress.

For example, a mirror driver in which a pair of piezoelectric actuators are arranged on both sides of the mirror unit and a piezoelectric actuator is coupled to edges of the mirror unit through a coupler is known in the art as a light deflector. In such a mirror driver known in the art, the mirror unit and the piezoelectric actuator are coupled to each other by a coupler that has a folded structure, and a sensing electrode is mounted on such a coupler.

SUMMARY

Embodiments of the present disclosure described herein provide a light deflector, an optical scanning system, and an image projection device. The light deflector includes a fixed part, a movable part provided with a reflection plane, a pair of elastic supporting units configured to support the movable part, a pair of connecting parts configured to connect between the pair of elastic supporting units and the fixed part, and a driving unit configured to deform the pair of connecting parts to make the movable part oscillate. The pair of connecting parts are supported by the fixed part in a cantilevered state, and each one of the pair of connecting parts having a folded structure. An optical scanning system includes the light deflector. An image projection device includes the light deflector.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 31 is a rear-side plan view of a light deflector according to the seventh embodiment of the present disclosure.

Figure 1:
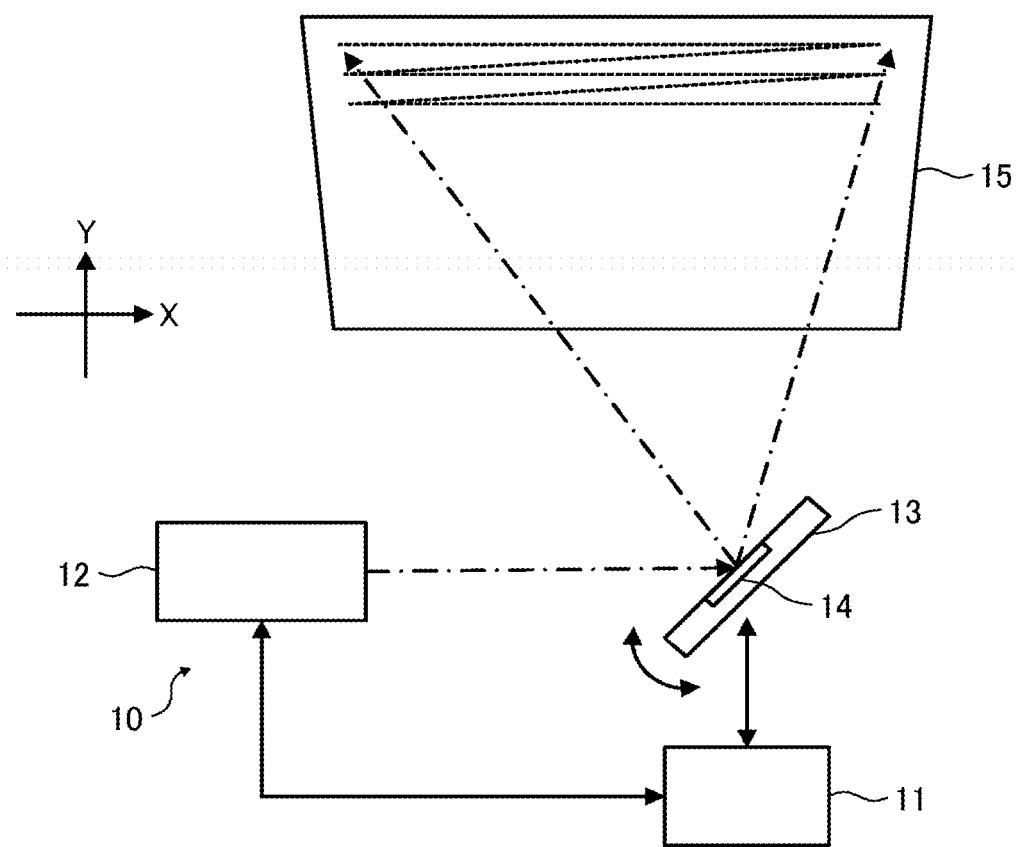
FIG. 1 is a schematic diagram of an optical scanning system according to embodiments of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below in detail with reference to the drawings.

Firstly, an optical scanning system 10 provided with a driving circuit 11 according to embodiments of the present disclosure is described below in detail with reference to FIG. 1 to FIG. 4.

FIG. 1 is a schematic diagram of the optical scanning system 10 according to embodiments of the present disclosure.

As illustrated in FIG. 1, the optical scanning system 10 deflects the light emitted from a light-source device 12 in accordance with the control of a drive circuit 11, with a reflection plane 14 provided for a light deflector 13, so as to optically scan a target surface 15.

The optical scanning system 10 includes the drive circuit 11, the light-source device 12, and the light deflector 13 provided with the reflection plane 14.

For example, the driving circuit 11 is an electronic circuit unit provided with a central processing unit (CPU) and a field-programmable gate array (FPGA). For example, the light deflector 13 has the reflection plane 14, and is a micro-electromechanical systems (MEMS) device in which the reflection plane 14 is movable.

For example, the light-source device 12 is a laser device that emits laser beams. Note also that the target surface 15 is, for example, a screen.

The drive circuit 11 generates control instructions for the light-source device 12 and the light deflector 13 based on the optical scanning information obtained from an external device, and outputs a driving signal to the light-source device 12 and the light deflector 13 based on the generated control instructions.

The light-source device 12 emits light based on the received driving signal.

The light deflector 13 drives the reflection plane 14 in at least one of the uniaxial directions or biaxial directions, based on the received driving signal.

Due to such a configuration, for example, the reflection plane 14 of the light deflector in the optical scanning system 10 13 can biaxially be driven in a reciprocating manner within a predetermined range, and the light that is emitted from the light-source device 12 to enter the reflection plane 14 can be deflected around a prescribed axis to perform optical scanning, under control of the drive circuit 11, which is based on the image data that is an example of the optical scanning information. Accordingly, an image can be projected onto the target surface 15 as desired.

The light deflector 13 and the control that is performed by the drive circuit 11 according to the present embodiment will be described later in detail.

A hardware configuration of the optical scanning system 10 is described below with reference to FIG. 2.

Figure 2:
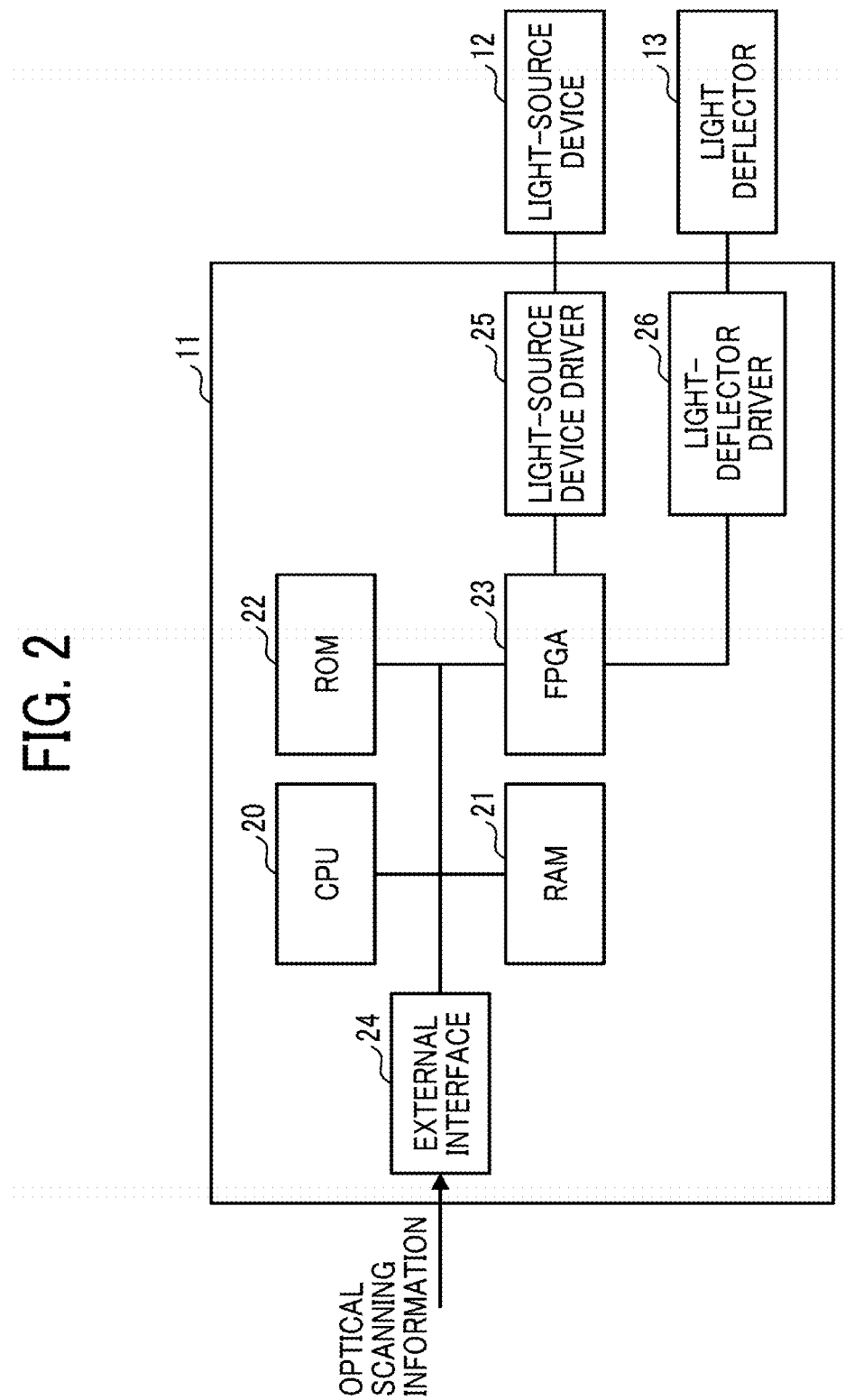
FIG. 2 is a diagram illustrating a hardware configuration of an optical scanning system according to embodiments of the present disclosure.

FIG. 2 is a diagram illustrating a hardware configuration of the optical scanning system 10 according to embodiments of the present disclosure.

As illustrated in FIG. 2, the optical scanning system 10 includes the drive circuit 11, the light-source device 12, and the light deflector 13, and these elements are electrically connected to each other.

Among those elements, the drive circuit 11 is provided with a central processing unit (CPU) 20, a random access memory (RAM) 21, a read only memory (ROM) 22, a field-programmable gate array (FPGA) 23, an external interface (I/F) 24, a light-source device driver 25, and a light-deflector driver 26.

The CPU 20 loads into the RAM 21 a program or data from a storage device such as the ROM 22 and performs processes. Accordingly, the controls or functions of the entirety of the drive circuit 11 are implemented.

The RAM 21 is a volatile storage device that temporarily stores data or a computer program.

The ROM 22 is a read-only nonvolatile storage device that can store a computer program or data even when the power is switched off, and stores, for example, data or a processing program that is executed by the CPU 20 to control the multiple functions of the optical scanning system 10.

The FPGA 23 is a circuit that outputs a control signal to the light-source device driver 25 and the light-deflector driver 26 appropriately, according to the processes performed by the CPU 20.

For example, the external interface 24 is an interface with an external device or the network. For example, the external device may be a host device such as a personal computer (PC) and a storage device such as a universal serial bus (USB) memory, a secure digital (SD) card, a compact disc (CD), a digital versatile disc (DVD), a hard disk drive (HDD), and a solid state drive (SSD). For example, the network may be a controller area network (CAN) of a vehicle, a local area network (LAN), and the Internet. The external interface 24 is satisfactory as long as it has a configuration by which connection to an external device or communication with an external device is achieved. The external interface 24 may be provided for each external device.

The light-source driver is an electric circuit that outputs a driving signal such as a driving voltage to the light-source device 12 in accordance with the received control signal.

The light-deflector driver 26 is an electric circuit that outputs a driving signal such as a driving voltage to the light deflector 13 in accordance with the control signal input from the FPGA 23.

In the drive circuit 11, the CPU 20 acquires the optical scanning information from an external device or a network through the external interface 24. Note that any configuration may be used as long as the CPU 20 can acquire the optical scanning information, and the optical scanning information may be stored in the ROM 22 or in the FPGA 23 in the drive circuit 11, or a storage device such as an SSD may be newly provided in the drive circuit 11 and the optical scanning information may be stored in the storage device.

The optical scanning information in the present embodiment is information about the way of optical scanning to be performed on the target surface 15.

For example, the optical scanning information is image data in a case where an image is to be displayed by optical scanning, and the optical scanning information is writing data indicating the order and portion of writing in a case where optical writing is to be performed by optical scanning. Furthermore, for example, the optical scanning information is irradiation data indicating the timing and range of irradiation of light for object recognition in a case where an object is to be recognized by optical scanning.

The drive circuit 11 according to the present embodiment can implement the functional configuration described below by using commands from the CPU 20 and the hardware configuration illustrated in FIG. 2.

A functional configuration of the drive circuit 11 of the optical scanning system 10 is described below with reference to FIG. 3.

Figure 3:
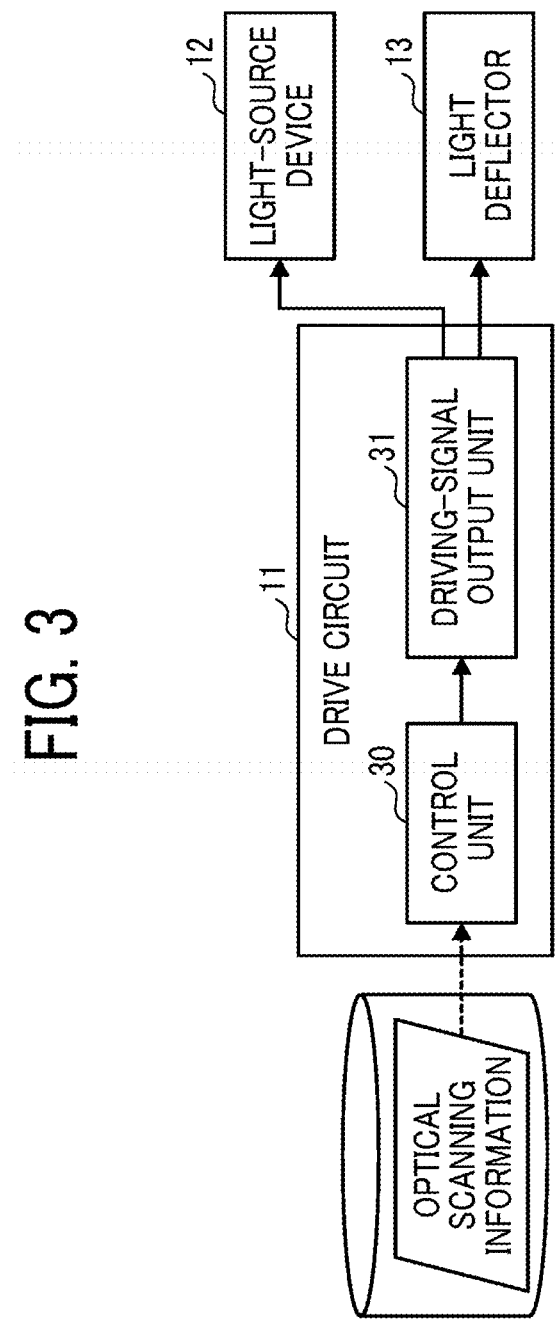
FIG. 3 is a diagram illustrating functional blocks of a drive circuit of an optical scanning system, according to embodiments of the present disclosure.

FIG. 3 is a diagram illustrating functional blocks of the drive circuit 11 of the optical scanning system 10, according to embodiments of the present disclosure.

As illustrated in FIG. 3, the drive circuit 11 has the functions of a control unit 30 and a driving-signal output unit 31.

For example, the control unit 30 is implemented by the CPU 20 or the FPGA 23, and obtains optical scanning information from an external device and converts the obtained optical scanning information into a control signal and outputs the obtained control signal to the driving-signal output unit 31. For example, the control unit 30 serves as a controller that acquires image data from an external device or the like as the optical scanning information, generates a control signal from the image data through predetermined processing, and outputs the control signal to the drive-signal output unit 31.

The driving-signal output unit 31 serves as an application unit. For example, the driving-signal output unit 31 is implemented by the light-source driver 25 and the light-deflector driver 26, and outputs a driving signal to the light-source device 12 or the light deflector 13 based on the received control signal. For example, the driving-signal output unit 31 that serves as an application unit may be provided for each destination to which a driving signal is output.

Note that the driving signal is a signal used to control operation of the light-source device 12 or the light deflector 13. For example, the driving signal in the light-source device 12 is a driving voltage used to control the timing at which light is emitted from the light source and the irradiation intensity. Moreover, for example, the driving signal in the light deflector 13 is a driving voltage used to control the timing and range of motion where the reflection plane 14 provided for the light deflector 13 is moved. Alternatively, the drive circuit 11 may obtain, from an external device such as the light-source device 12 or a light receiver, the timing of light emission or timing of light reception of the light emitted from the light source, and may synchronize the obtained timing of light emission or timing of light reception with the operation of the light deflector 13.

Processes in which the optical scanning system 10 performs optical scanning on the target surface 15 is described below with reference to FIG. 4.

Figure 4:
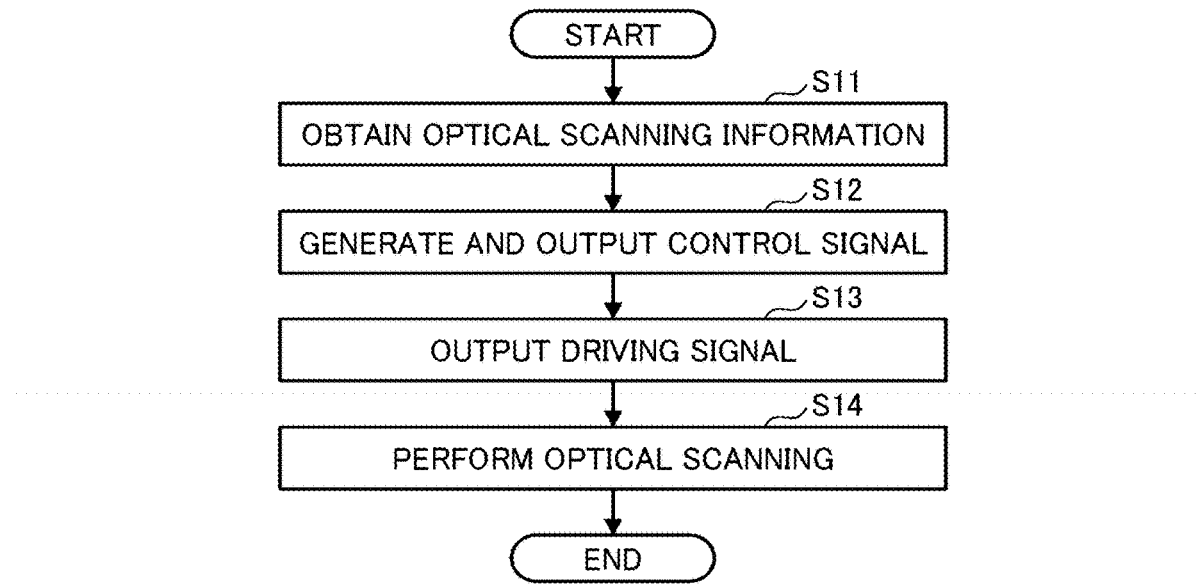
FIG. 4 is a flowchart of the processes performed by an optical scanning system, according to embodiments of the present disclosure.

FIG. 4 is a flowchart of the processes performed by the optical scanning system 10, according to embodiments of the present disclosure.

In a step S11, the control unit 30 obtains optical scanning information from, for example, an external device.

In a step S12, the control unit 30 generates a control signal from the obtained optical scanning information, and outputs the generated control signal to the driving-signal output unit 31.

At step S13, the driving-signal output unit 31 outputs a driving signal to each of the light-source device 12 and the light deflector 13, based on the input control signal.

At step S14, the light-source device 12 emits light based on the input driving signal. The light deflector 13 moves the reflection plane 14 based on the received driving signal. The driving of the light-source device 12 and the light deflector 13 causes light to be deflected in a given direction, and optical scanning is performed.

In the optical scanning system 10 as described above, a single drive circuit 11 includes a device and functions used to control the light-source device 12 and the light deflector 13. However, no limitation is indicated thereby, and a drive circuit for the light-source device and a drive circuit for the light deflector may be provided separately.

In the optical scanning system 10 as described above, a single driving circuit 11 includes functions of the control unit 30 used to control the light-source device 12 and the light deflector 13, and functions of the driving-signal output unit 31. However, these functions may separately be provided, and for example, a separate drive-signal output device with the drive-signal output unit 31 may be provided in addition to the drive circuit 11 including the control unit 30. An optical deflection system that performs optical deflection may be configured by the drive circuit 11 and the light deflector 13 provided with the reflection plane 14, which are elements of the above optical scanning system 10.

An image projection apparatus that is provided with the drive circuit 11 according to the present embodiment is described below in detail with reference to FIG. 5 and FIG. 6.

Figure 5:
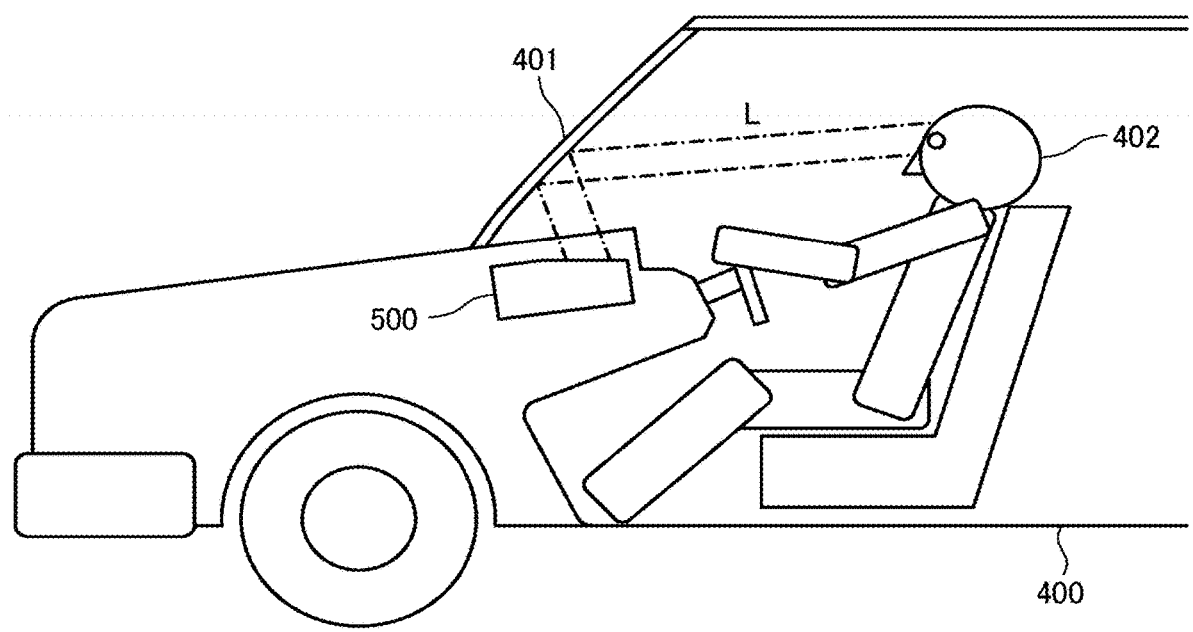
FIG. 5 is a schematic diagram illustrating a vehicle provided with a heads-up display according to embodiments of the present disclosure.

FIG. 5 is a diagram illustrating a vehicle 400 provided with a heads-up display 500 that serves as an image projection apparatus, according to embodiments of the present disclosure.

Figure 6:
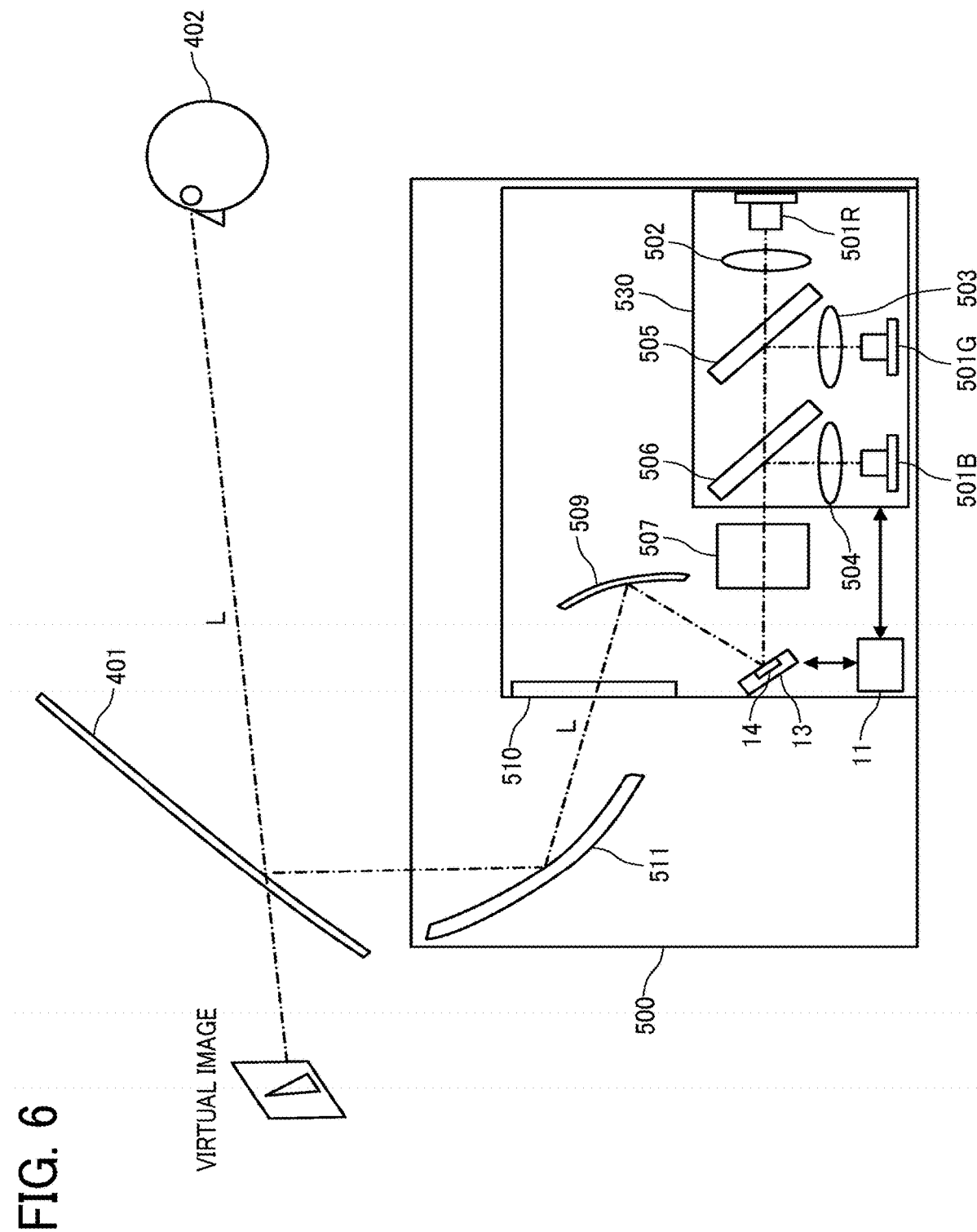
FIG. 6 is a schematic diagram illustrating a heads-up display according to embodiments of the present disclosure.

FIG. 6 is a schematic diagram illustrating the heads-up display 500 according to embodiments of the present disclosure.

The image projection apparatus is an apparatus that performs optical scanning to project an image, and is, for example, the heads-up display 500.

As illustrated in FIG. 5, for example, the heads-up display 500 is provided near a front windshield such as a front windshield 401 of the vehicle 400. A projection light L, which is the light for projecting an image, that is emitted from the heads-up display 500 is reflected by the front windshield 401, and is headed for a user. In the present embodiment, the user is also referred to as observer or a driver 402.

Accordingly, the driver 402 can visually recognize an image or the like projected by the heads-up display 500 as a virtual image. Note that a combiner may be disposed on the inner wall of the front windshield, and the user may visually recognize a virtual image formed by the projection light L that is reflected by the combiner.

As illustrated in FIG. 6, the heads-up display 500 emits laser beams from red, green, and blue laser beam sources 501R, 501G, and 501B, respectively. The emitted laser beam passes through an incident optical system and is then deflected by the light deflector 13 having the reflection plane 14. The incident optical system includes collimator lenses 502, 503, and 504, which are provided for the respective laser beam sources, two dichroic mirrors 505 and 506, and a light-intensity adjuster 507.

Then, the deflected laser beams pass through a projection optical system composed of a free-form surface mirror 509, an intermediate screen 510, and a projection mirror 511, and are projected onto a screen.

In the heads-up display 500, the laser beam sources 501R, 501G, and 501B, the collimator lenses 502, 503, and 504, and the dichroic mirrors 505 and 506 are unitized as a light source unit 530 in an optical housing.

The heads-up display 500 as described above projects an intermediate image that is displayed on the intermediate screen 510, on the front windshield 401 of the vehicle 400, thereby allowing the driver 402 to visually recognize the intermediate image as a virtual image.

The laser beams of the respective colors emitted from the laser beam sources 501R, 501G, and 501B are approximately collimated by the collimator lenses 502, 503, and 504 and are combined by the two dichroic mirrors 505 and 506. The light intensity of the combined laser beams is adjusted by the light-intensity adjuster 507, and then two-dimensional scanning is performed by the light deflector 13 provided with the reflection plane 14. The projection light L that has been two-dimensionally scanned by the light deflector 13 is reflected by the free-form surface mirror 509 so as to correct the distortion, and then is concentrated onto the intermediate screen 510. Accordingly, an intermediate image is displayed. The intermediate screen 510 is constituted by a microlens array in which a plurality of microlenses are two-dimensionally arranged, and expands the projected light L incident on the intermediate screen 510 in units of microlens.

The light deflector 13 moves the reflection plane 14 biaxially in a reciprocating manner to perform two-dimensional scanning by using the projected light L incident on the reflection plane 14. The driving of the light deflector 13 is controlled in synchronization with the light-emitting timing of the laser beam sources 501R, 501G, and 501B.

In the above description, the heads-up display 500 is described as an example of the image projection apparatus. However, no limitation is indicated thereby, and the image projection apparatus may be any apparatus that performs optical scanning, using the light deflector 13 provided with the reflection plane 14, to project an image.

For example, the present disclosure is also applicable to a projector that is placed on a desk or the like to project an image on a display screen, a head-mounted display that is incorporated in a wearable member on the head of the observer, for example, and that projects an image on a reflective-and-transmissive screen of the wearable member or on an eye ball as a screen, and the like.

The image projection apparatus may be incorporated in, not only a vehicle or the wearable member, but also, for example, a mobile object such as an aircraft, a ship, or a moving robot, and an immobile object such as an operation robot that operates a driving target such as a manipulator without moving from the installed location.

An optical writing device 600 that is provided with the drive circuit 11 according to the present embodiment is described below in detail with reference to FIG. 7 and FIG. 8.

Figure 7:
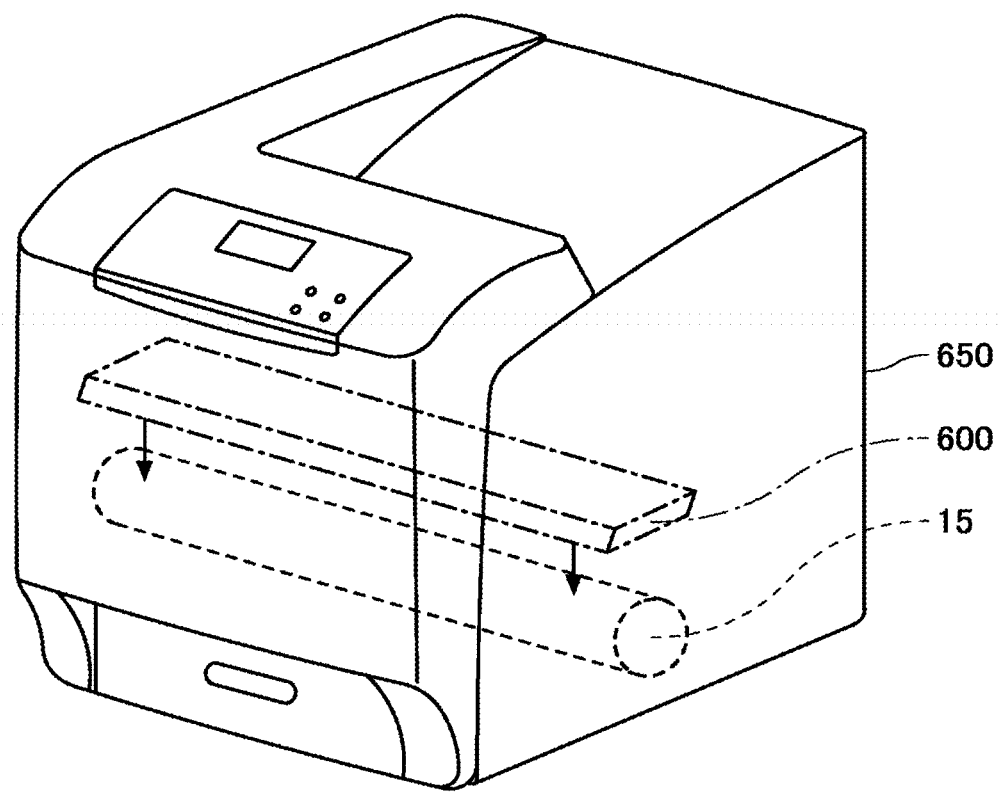
FIG. 7 is a diagram illustrating an image forming apparatus provided with an optical writing device, according to embodiments of the present disclosure.

FIG. 7 is a diagram illustrating an image forming apparatus provided with the optical writing device 600, according to embodiments of the present disclosure.

Figure 8:
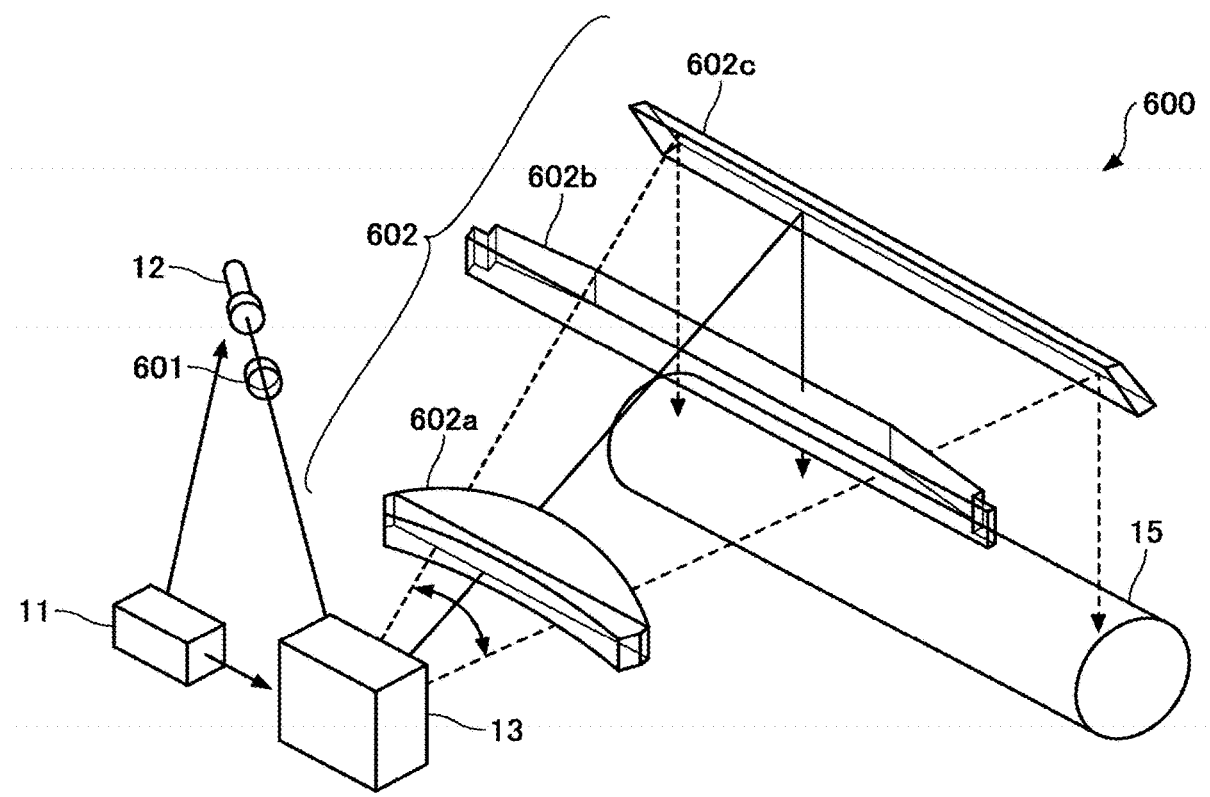
FIG. 8 is a schematic diagram illustrating a configuration of an optical writing device according to embodiments of the present disclosure.

FIG. 8 is a schematic diagram illustrating a configuration of the optical writing device 600 according to embodiments of the present disclosure.

As illustrated in FIG. 7, the optical writing device 600 is used as a component of an image forming apparatus typified by a laser-beam printer 650 or the like. The laser-beam printer 650 serves as a printer that uses laser beams, and the optical writing device 600 in the image forming apparatus performs optical scanning on a photoconductor drum, which is the target surface 15, by using one or more laser beams, thereby performing optical writing on the photoconductor drum.

As illustrated in FIG. 8, in the optical writing device 600, the laser beam from the light-source device 12 such as a laser element passes through an imaging optical system 601 such as a collimator lens and is then deflected uniaxially or biaxially by the light deflector 13 having the reflection plane 14.

The laser beam deflected by the light deflector 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15.

The light deflector 13 that includes the light-source device 12 and the reflection plane 14 are driven based on the control performed by the drive circuit 11.

As described above, the optical writing device 600 can be used as a component of the image forming apparatus that serves as a printer using laser beams.

By modifying the scanning optical system so as to enable not only uniaxial optical scanning but also biaxial optical scanning, the optical writing device 600 can also be used as a component of an image forming apparatus such as a laser labeling device that deflects laser beam to perform optical scanning on thermal media and print letters by heating.

The light deflector 13 having the reflection plane 14 to be applied to the optical writing device is advantageous in saving power of the optical writing device because power consumption for driving the light deflector 13 is less than that for driving a polygon mirror or the like.

The light deflector 13 makes a smaller wind noise when the mirror substrate oscillates compared with a polygon mirror, and thus is advantageous in achieving low noise of an optical writing device. The optical writing device requires much smaller footprint than that of a polygon mirror, and the amount of heat generated by the light deflector 13 is small. Accordingly, downsizing is easily achieved, and thus the optical writing device is advantageous in downsizing the image forming apparatus.

An object recognition device that is provided with the drive circuit 11 according to the above embodiment of the present disclosure is described below in detail with reference to FIG. 9 and FIG. 10.

Figure 9:
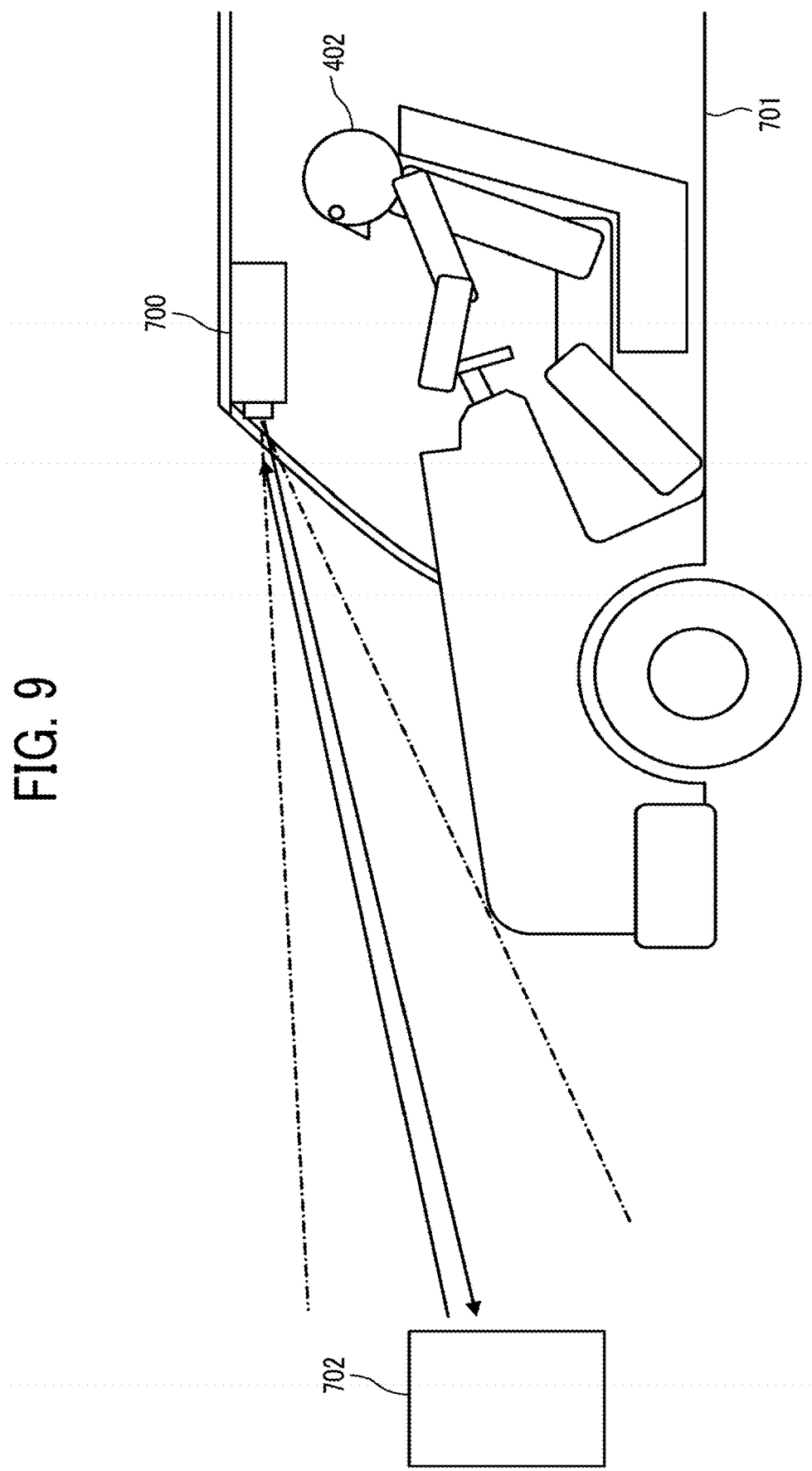
FIG. 9 is a schematic diagram illustrating a vehicle provided with a laser imaging detection and ranging (LiDAR) device that serves as an object recognition device, according to embodiments of the present disclosure.

FIG. 9 is a schematic diagram illustrating a vehicle 701 provided with a laser imaging detection and ranging (LiDAR) device 700 that serves as an object recognition device, according to embodiments of the present disclosure.

Figure 10:
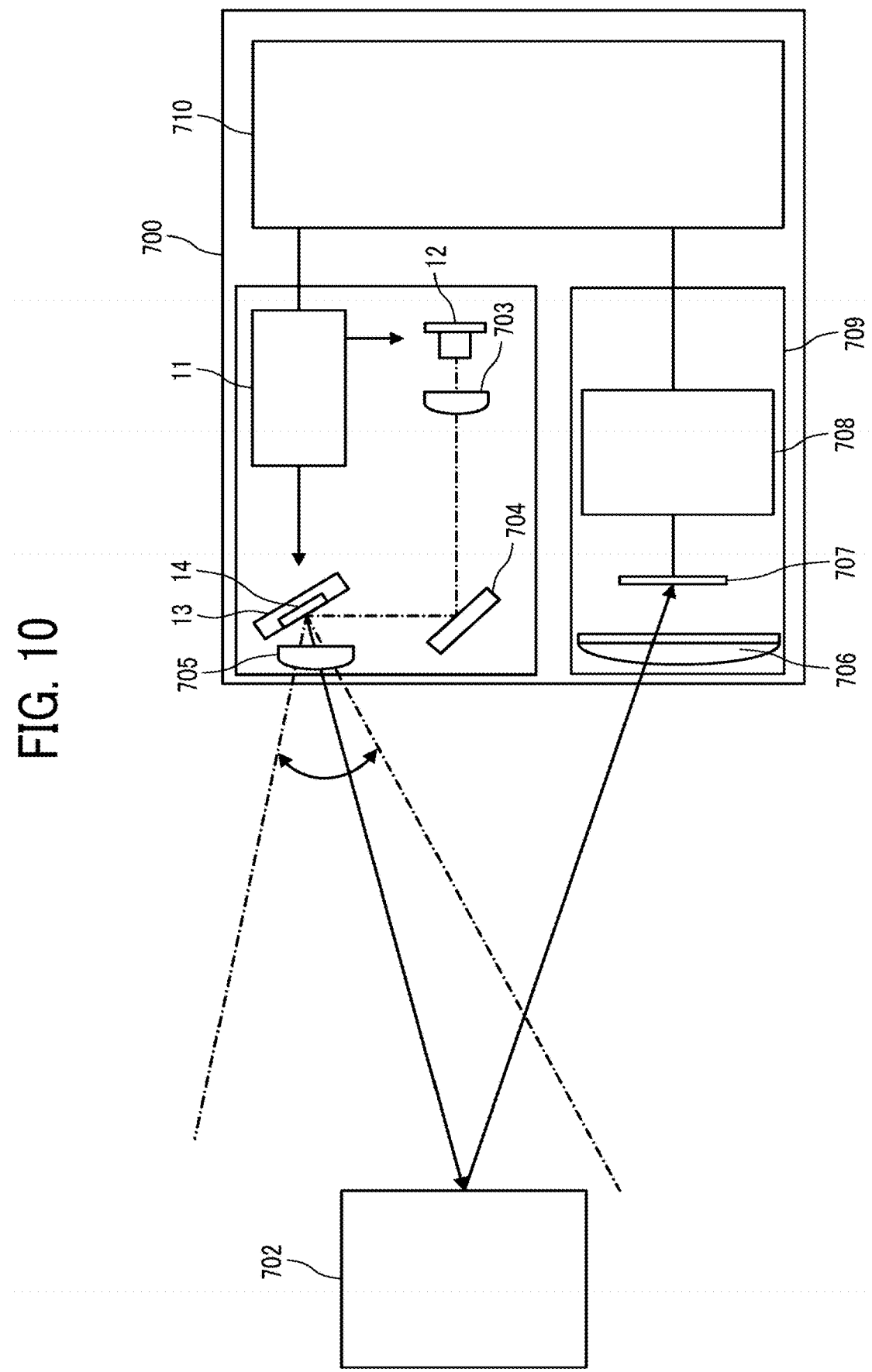
FIG. 10 is a schematic diagram illustrating a configuration of a LiDAR device according to embodiments of the present disclosure.

FIG. 10 is a schematic diagram illustrating a configuration of the LiDAR device 700 according to embodiments of the present disclosure.

The object recognition device is an apparatus that recognizes an object in a target direction, and is, for example, the LiDAR device 700.

As illustrated in FIG. 9, for example, the LiDAR device 700 is provided for a vehicle 701 to perform optical scanning in a target direction and receive the light reflected from an object 702 that exists in the target direction. Accordingly, the object 702 can be recognized by the LiDAR device 700.

As illustrated in FIG. 10, the laser beam that is emitted from the light-source device 12 passes through an incident optical system constituted by a collimator lens 703, which is an optical system approximately collimating diverging light, and a plane mirror 704, and then is uniaxially or biaxially scanned by the light deflector 13 provided with the reflection plane 14.

Then, the laser beam is emitted to the object 702 ahead of the LiDAR device 700, as passing through, for example, a projection lens 705 that serves as a projection optical system. The operation of the light-source device 12 and the light deflector 13 is controlled by the driving circuit 11. The light that is reflected by the object 702 is detected by a photodetector 709.

In other words, the reflected light passes through, for example, a condenser lens 706 that serves as a light-receptive optical system, and is received by an image sensor 707. Then, the image sensor 707 outputs a detected signal to a signal processing circuit 708. The signal processing circuit 708 performs predetermined processing on the input detected signal, such as binarization or noise processing, and outputs the result to a distance measuring circuit 710.

The distance measuring circuit 710 determines whether the object 702 is present based on the time difference between the timing at which the light-source device 12 emits laser beam and the timing at which the photodetector 709 receives the laser beam or the phase difference among pixels of the image sensor 707 that receives light, and calculates the distance to the object 702.

The light deflector 13 that is provided with the reflection plane 14 cannot easily be broken and is compact compared with a polygon mirror, and thus, a highly durable and compact LiDAR device can be provided.

Such a LiDAR device is attached to, for example, a vehicle, an aircraft, a ship, a robot, or the like, and can perform optical scanning within a predetermined range to determine whether an obstacle is present or to recognize the distance to the obstacle.

In the embodiment as described above, the LiDAR device 700 is described as an example of the object recognition device. However, no limitation is indicated thereby, and the object recognition device may be any apparatus that performs optical scanning as the driving circuit 11 controls the light deflector 13 provided with the reflection plane 14 and that receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Figure 11:
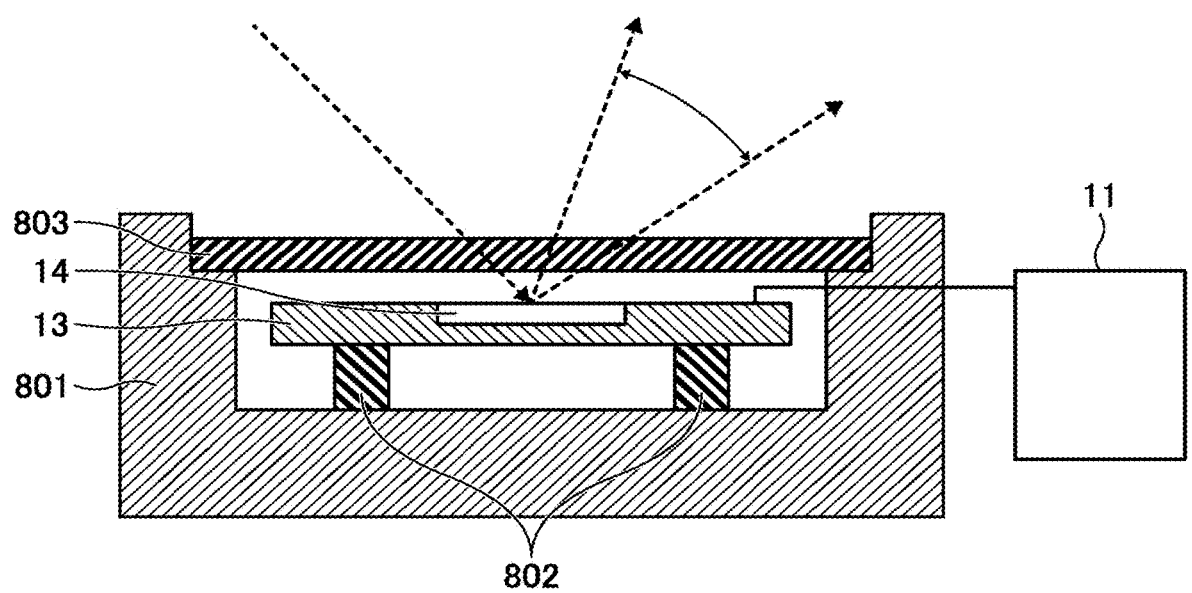
FIG. 11 is a schematic diagram illustrating a packaged light deflector according to embodiments of the present disclosure.

With reference to FIG. 11, packaging of the light deflector 13 that is controlled by the drive circuit 11 according to the present embodiment is described below.

FIG. 11 is a schematic diagram illustrating the light deflector 13 that is packaged, according to embodiments of the present disclosure.

As illustrated in FIG. 11, the light deflector 13 is attached to an attaching component 802 arranged inside the package 801, and is hermetically sealed and packaged as a part of the package 801 is covered with a light transmission member 803.

Further, inert gas such as nitrogen is hermetically sealed inside the package. Due to this configuration, deterioration due to oxidization can be prevented in the light deflector 13, and durability against changes in the environment such as temperature can further be improved.

The light deflector 13 and the control that is performed by the drive circuit 11 according to the present embodiment, which are used for the optical deflection system, the optical scanning system, the image projection apparatus, the optical writing device, and the object recognition device as described above, are described below in detail. In the drawings, like reference signs denote like elements, and overlapping description may be omitted.

In the description of the embodiments of the present disclosure, terms such as rotation, oscillation, and movement are used. As these terms all indicate that the mirror unit 110 is moved to perform optical deflection, one of these terms may be used as a synonym for the other terms. Among the directions indicated by arrows, the X-direction indicates a direction parallel to the axis A, and the Y-direction indicates a direction parallel to the axis B. The Z-direction indicates a direction orthogonal to the XY plane. Note also that the Z-direction indicates an example of stacking direction.

In the embodiments of the present disclosure, terms such as "vertical," "parallel," "orthogonal," and "perpendicular" are not used in a strict sense, and may be used in an approximate manner when the effects are not affected. More specifically, the terms "vertical," "orthogonal," and "perpendicular" may indicate a range of $90\pm10°$ for the angle that a pair of lines form, and the term "parallel" may indicate a range of $0\pm10°$ for the angle that a pair of lines form.

First Embodiment

Figure 12:
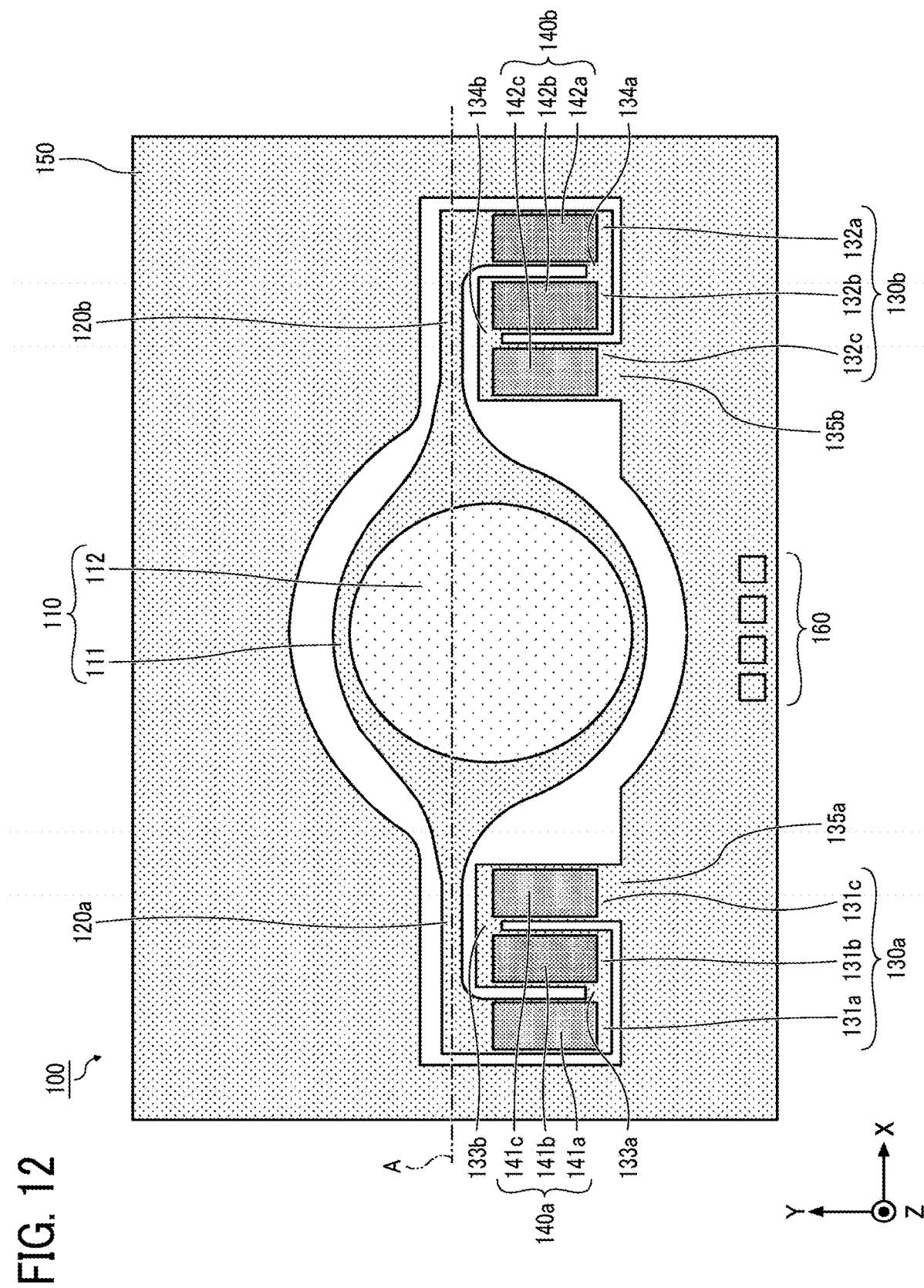
FIG. 12 is a plan view of a light deflector according to a first embodiment of the present disclosure.

FIG. 12 is a plan view of a light deflector 100 according to a first embodiment of the present disclosure.

In FIG. 12, the light deflector 100 is viewed from the front side where the reflection plane can be observed.

Figure 13:
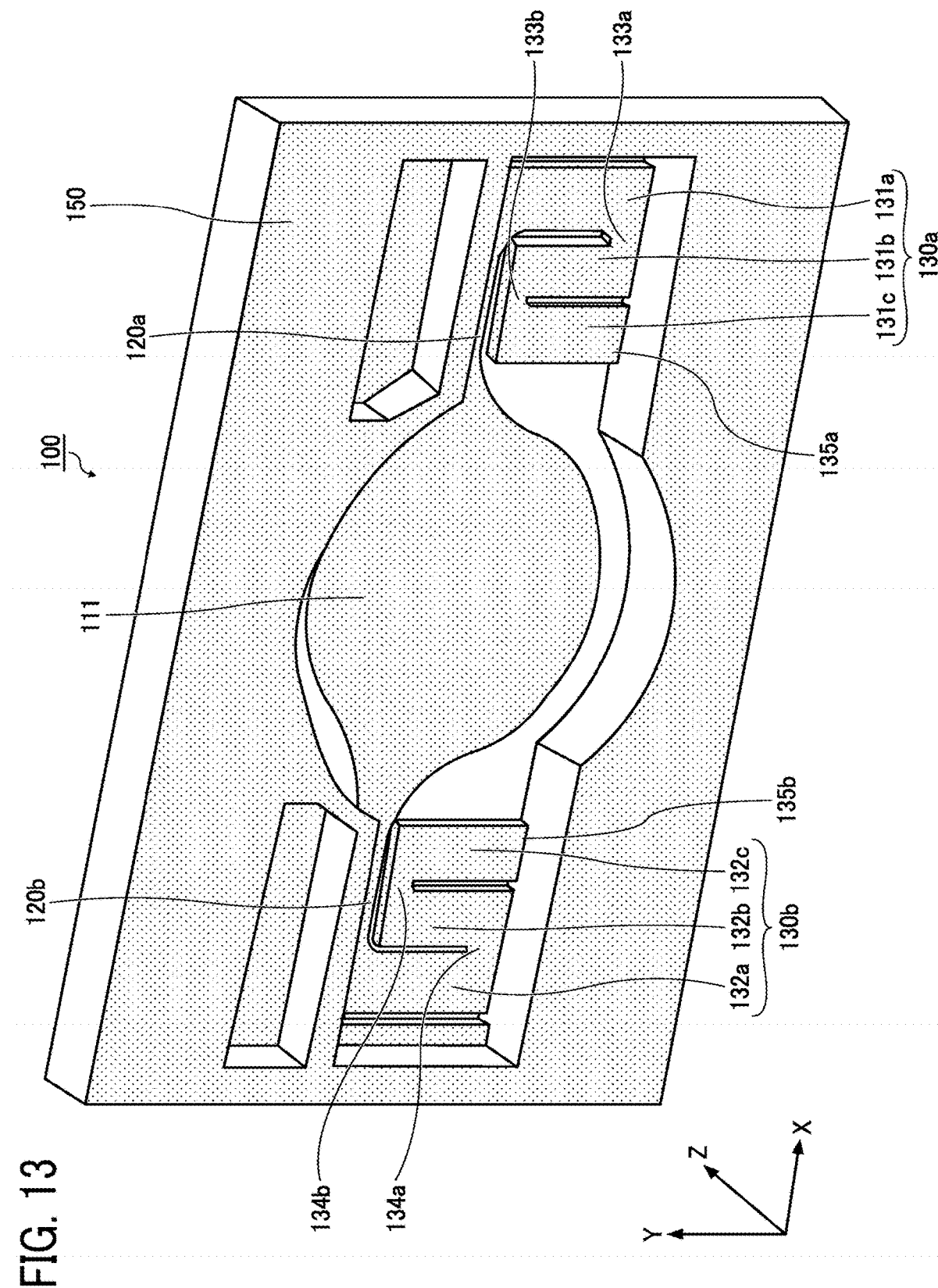
FIG. 13 is a perspective view of a light deflector according to the first embodiment of the present disclosure.

FIG. 13 is a rear perspective view of the light deflector 100 according to the first embodiment of the present disclosure.

As illustrated in FIG. 12 and FIG. 13, the light deflector 100 is in a cantilevered state and rotates a movable part provided with a reflection plane to uniaxially deflect the light that is incident on the reflection plane around the axis A parallel to the X-axis.

The light deflector 100 is provided with a configuration or structure to enable the rotation of the mirror unit 110 around the axis A. In other words, as the mirror unit 110 uniaxially rotates, the light deflector 100 can deflect the incident light while uniaxially scanning the incident light. The structure of the light deflector 100 is described below in detail.

The light deflector 100 includes a mirror unit 110 provided with a reflection plane 112 that reflects incident light, a pair of torsion bars 120a and 120b, a pair of connecting parts 130a and 130b, a pair of driving units 140a and 140b, a fixed part 150, and an electrode connecting part 160.

For example, the light deflector 100 is molded by etching a sheet of silicon on insulator (SOI) substrate. On such a molded SOI substrate, the reflection plane 112 or the pair of driving units 140a and 140b are formed. As a result, these elements are integrally molded. The above-described multiple elements may be formed after the SOI substrate is molded, or may be formed while the SOI substrate is being molded.

As illustrated in FIG. 12, the SOT substrate is a substrate in which, on a first silicon layer formed of single crystal silicon (Si), an oxidized silicon layer is formed, and on the oxidized silicon layer, a second silicon layer formed of single crystal silicon is further formed. In the following description, the first silicon layer and the second silicon layer may be referred to as a silicon supporting layer and a silicon active layer, respectively.

The silicon active layer has a small thickness in the Z-axis direction compared with the X-axis direction or the Y-axis direction. Due to this configuration, a member that is made of the silicon active layer serve as an elastic member. The thickness of the silicon active layer is, for example, about 20 to 60 μm. Note also that the SOI substrate does not always have to be planar, and may have, for example, curvature.

In the following description, cases in which the light deflector 100 is made of a silicon on insulator (SOI) substrate are described. However, no limitation is indicated thereby, and as long as the substrate can be integrally processed by etching or the like and can be partially elastic, the member used for forming the light deflector 100 is not limited to the SOT substrate. Such an alternative substrate may be, for example, a substrate that is made by wafer-bonding multiple silicon (Si) substrates, a substrate using polysilicon that is formed as a thick film, and a substrate made of, for example, metallic glass or sapphire other than silicon (Si).

The mirror unit 110 is a movable part that can rotate around the axis A, and includes, for example, a mirror-unit base 111 and a reflection plane 112 that is formed on the +Z surface of the mirror-unit base 111. The shape of the mirror unit 110 and the mirror-unit base 111 is not limited to any particular shape. For example, the shape of the mirror unit 110 and the mirror-unit base 111 may be circular or elliptical. The mirror-unit base 111 includes, for example, a silicon active layer. The reflection plane 112 includes a thin metal film made of, for example, aluminum (Al), gold (Au), and silver (Ag).

The mirror unit 110 may include a rib for strengthening the mirror unit formed on the −Z-side surface of the mirror-unit base 111. The rib includes, for example, a silicon supporting layer and an oxidized silicon layer, and can prevent distortion on the reflection plane 112 caused by the movement.

For example, the center of gravity of the mirror unit 110 may be offset in the direction toward the connecting portions at which the pair of connecting parts 130a and 130b are coupled to the fixed part 150, with reference to the axis A that is the central axis of the pair of torsion bars 120a and 120b. Due to such an offset configuration or structure, the amplitude of the movable part can be increased.

Each one of the pair of torsion bars 120a and 120b has an end coupled to the mirror-unit base 111 and extends in the direction of the axis A. In other words, the pair of torsion bars 120a and 120b are a pair of elastic supporting units that support the mirror unit 110 around the axis A in a movable manner. Each of the torsion bars 120a and 120b includes, for example, a silicon active layer.

The pair of connecting parts 130a and 130b couple the pair of torsion bars 120a and 120b to the fixed part 150, respectively, and are supported by the fixed part 150 in a cantilevered state. For example, the connecting parts 130a and 130b are arranged across the mirror unit 110 so as to be symmetrical in pairs across the line of symmetry parallel to the Y-axis that passes through the center of the reflection plane 112.

In other words, each one of the pair of connecting parts 130a and 130b is arranged on one side of the axis A that is the central axis of the pair of torsion bars 120a and 120b, and the mirror unit 110 and the pair of torsion bars 120a and 120b are supported by the fixed part 150 in a cantilevered state through the pair of connecting parts 130a and 130b.

The connecting part 130a includes a plurality of strip-shaped drive bars 131a, 131b, and 131c whose longer-side direction is in the direction perpendicular to the axis A (i.e., the direction parallel to the Y-axis), and a coupler that couples the multiple drive bars to each other to have a folded structure. The drive bars 131a, 131b, and 131c are coupled to turn through a coupler to achieve a folded structure.

More specifically, the end of the drive bar 131a on the +Y side is coupled to the end of the torsion bar 120a on the other side of the mirror-unit base 111. Moreover, the end of the drive bar 131a on the −Y side is coupled to the end of the drive bar 131b on the −Y side through a coupler 133a. The end of the drive bar 131b on the +Y side is coupled to the end of the drive bar 131c on the +Y side through a coupler 133b. The end of the drive bar 131c on the −Y side is coupled to an inner side of the fixed part 150. The drive bar 131c is coupled to the fixed part 150 at a fixed edge 135a.

In a similar manner to the above, the connecting part 130b includes strip-shaped drive bars 132a, 132b, and 132c whose longer-side direction is in the direction perpendicular to the axis A (i.e., the direction parallel to the Y-axis), and a coupler that couples the multiple drive bars to each other to have a folded structure. The drive bars 132a, 132b, and 132c are coupled to turn through a coupler. In other words, the drive bars 132a, 132b, and 132c have a folded structure.

More specifically, the end of the drive bar 132a on the +Y side is coupled to the end of the torsion bar 120b on the other side of the mirror-unit base 111. Moreover, the end of the drive bar 132a on the −Y side is coupled to the end of the drive bar 132b on the −Y side through a coupler 134a. The end of the drive bar 132b on the +Y side is coupled to the end of the drive bar 132c on the +Y side through a coupler 134b. The end of the drive bar 132c on the −Y side is coupled to an inner side of the fixed part 150. The drive bar 132c is coupled to the fixed part 150 at a fixed edge 135b.

The driving unit 140a is formed on the front side of the connecting part 130a, where the reflection plane 112 formed, and such a configuration establishes a unimorph structure. The driving unit 140b is formed on the front side of the connecting part 130b, and such a configuration establishes a unimorph structure. The driving units 140a and 140b deform the pair of connecting parts 130a and 130b such that the mirror unit 110 oscillate.

The driving unit 140a includes a plurality of strip-shaped driving elements 141a, 141b, and 141c whose longer-side direction is in the direction perpendicular to the axis A (i.e., the direction parallel to the Y-axis). The driving element 141a is formed on the front side of the drive bar 131a. The driving element 141b is formed on the front side of the drive bar 131b, and the driving element 141c is formed on the front side of the drive bar 131c. In other words, a driving element is arranged over each one of the turning portions of the connecting part 130a that has a folded structure.

In a similar manner to the above, the driving unit 140b includes a plurality of strip-shaped driving elements 142a, 142b, and 142c whose longer-side direction is in the direction perpendicular to the axis A (i.e., the direction parallel to the Y-axis). The driving element 142a is formed on the front side of the drive bar 132a, and the driving element 142b is formed on the front side of the drive bar 132b. In a similar manner, the driving element 142c is formed on the front side of the drive bar 132c. In other words, a driving element is arranged over each one of the turning portions of the connecting part 130b that has a folded structure.

Each one of the driving elements 141a, 141b, 141c, 142a, 142b, and 142c is a piezoelectric element, and includes, for example, a lower electrode, a piezoelectric circuit, and an upper electrode that are formed in this order on the +Z surface of the silicon active layer that serves as an elastic member. For example, each of the upper electrode and the lower electrode may be made of gold (Au) or platinum (Pt). For example, the piezoelectric circuit may be made of lead zirconate titanate (PZT), which is a piezoelectric material.

In the present embodiment, a set of odd-numbered drive bars when counted from the fixed part 150 side and a set of even-numbered drive bars when counted from the fixed part 150 side are alternately driven in the reversed-phase. As a result, the mirror unit 110 can oscillate around the axis A.

For example, the fixed part 150 is a rectangular-shaped supporting structure formed to surround the mirror unit 110. For example, the fixed part 150 is composed of a silicon supporting layer, an oxidized silicon layer, and a silicon active layer. Note also that it is not necessary for the fixed part 150 to be formed so as to surround the mirror unit 110 in a complete manner. For example, an open area may be arranged in the up-and-down directions in FIG. 12.

For example, the electrode connecting parts 160 are formed on the +Z surface of the fixed part 150. The electrode connecting parts 160 are electrically connected to the upper electrode and the lower electrode of each one of the driving elements 141a to 141c and 142a to 142c through electrode wiring of aluminum (Al) or the like. The electrode connecting part 160 is electrically connected to for example, a controller provided outside the light deflector 100. Each of the upper electrodes and lower electrodes may be directly connected to the electrode connecting parts 160. Alternatively, in some embodiments, the upper electrodes and lower electrodes may be indirectly connected to the electrode connecting parts 160 through a wire or the like that connects a pair of electrodes.

For example, a plurality of upper electrodes and lower electrodes of the at least one even-numbered driving element among a plurality of driving elements when counted from the fixed part 150 side are coupled to a first electrode included in the electrode connecting part 160, and a plurality of upper electrodes and lower electrodes of the at least one odd-numbered driving element among a plurality of driving elements when counted from the fixed part 150 side are coupled to a second electrode included in the electrode connecting part 160. The second electrode is different from the first electrode. In this configuration, the mirror unit 110 oscillates as voltage is alternately applied to the first electrode and the second electrode that are included in the electrode connecting part 160.

In the present embodiment, the driving unit 140a is formed on the front side of the connecting part 130a, and the driving unit 140b is formed on the front side of the connecting part 130b. However, no limitation is indicated thereby, and the driving unit may be arranged on the rear side (i.e., the plane on the −Z side) of the pair of connecting parts, or may be arranged on both the front side and rear side of the pair of connecting parts.

The shapes of the components are not limited to the shapes in the embodiment as long as the mirror unit 110 can rotate and oscillate around the first axis A. For example, the torsion bars 120a and 120b and the connecting parts 130a and 130b may have a shape with curvature.

Furthermore, an insulating layer that is made of, for example, a oxidized silicon layer may be formed on at least one of the +Z surface of the upper electrode of the driving units 140a and 140b and the +Z surface of the fixed part 150.

In this case, electrode wiring is provided on the insulating layer, and the insulating layer is partially removed as an opening or is not formed at a connection spot where the upper electrode or the lower electrode and the electrode wiring are coupled to each other, so that the driving units 140a and 140b and the electrode wiring can be designed with an improved degree of freedom, and furthermore, a short circuit as a result of contact between electrodes can be controlled. The oxidized silicon layer may serve as antireflection coating.

The operation of the mirror unit 110 of the light deflector 100 is described below in detail.

Figure 14:
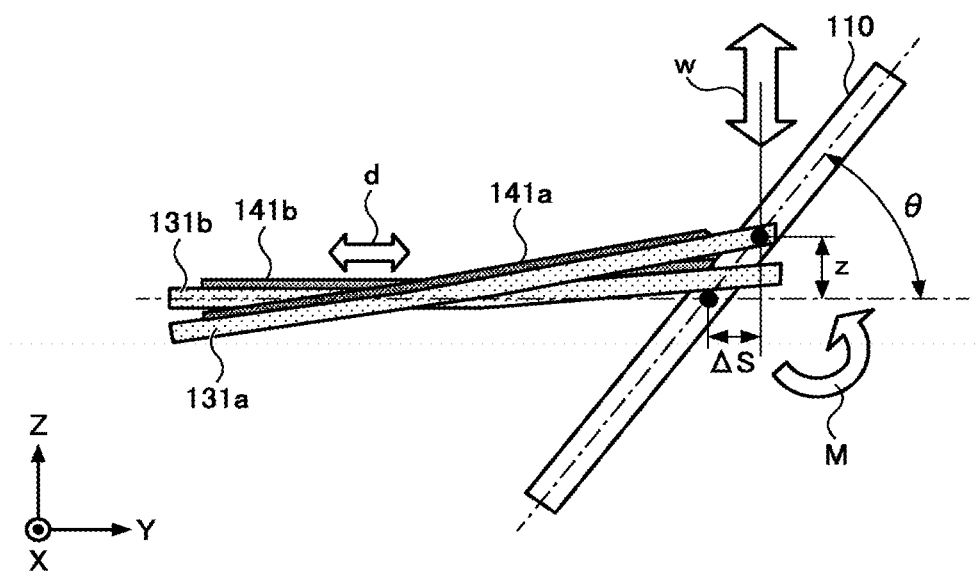
FIG. 14 is a schematic side view of how a mirror unit according to the first embodiment of the present disclosure moves.

FIG. 14 is a schematic side view of how the mirror unit 110 according to the first embodiment of the present disclosure moves.

In the light deflector 100, the pair of torsion bars 120a and 120b and the drive bars 131a to 131c and 132a to 132c are arranged such that the longer-side directions are approximately orthogonal to each other. Due to this configuration, the rotational power that is caused by bending the drive bars 131a to 131c and 132a to 132c can efficiently be converted into deformation power of the torsion bars 120a and 120b in twisting directions. As the mirror unit 110 and the pair of torsion bars 120a and 120b are supported by the pair of connecting parts 130a and 130b in a cantilevered state, each one of the pair of connecting parts 130a and 130b has a free end. Accordingly, the pair of connecting parts 130a and 130b can oscillate with a great amplitude.

Moreover, the center of gravity of the mirror unit 110 is offset in the direction toward the connecting portions at which the pair of connecting parts 130a and 130b are coupled to the fixed part 150, with reference to the axis A that is the central axis of the pair of torsion bars 120a and 120b. Accordingly, strong moment (oscillating force) can be generated at the mirror unit 110 when the drive bars 131a to 131c and 132a to 132c oscillate.

In the light deflector 100, the drive bars are arranged to have a folded structure and are driven in a resonant mode. Due to such a configuration, as illustrated in FIG. 14, the amount of deformation can be accumulated due to a folded structure of the drive bars. For example, in FIG. 14, the amount of deformation at the front end of the drive bar 131a is greater than the amount of deformation at the front end of the drive bar 131b.

As described above, as the amount of deformation is accumulated due to a folded structure of the drive bars and, a torsion-stress resonant mode of the pair of torsion bars 120a and 120b can be activated. As a result, the amplitude of the torsion bars 120a and 120b greatly increases, and a large moment M can be given to the mirror unit 110.

In FIG. 14, an arrow d indicates the directions in which the driving elements 141a and 141b deform, and ΔS indicates the amount of offset of the center of the mirror unit 110 with reference to the axis A.

w indicates the directions in which the front end of the drive bar swings, and z indicates the amount of deformation at the front end of the drive bar. Finally, θ indicates the rotation angle of the mirror unit 110.

Figure 15:
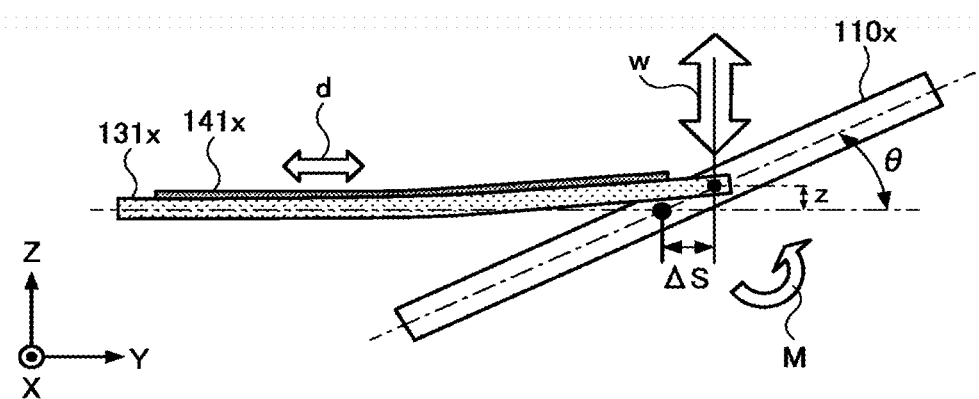
FIG. 15 is a schematic side view of how a mirror unit according to a control sample of the first embodiment of the present disclosure moves.

FIG. 15 is a schematic side view of how a mirror unit 110x according to a control sample of the first embodiment of the present disclosure moves.

The light deflector according to the control sample of the first embodiment of the present disclosure does not adopt a folded structure for drive bars, and a pair of drive bars 131x and a pair of driving units 141x are formed on both sides of the mirror unit 110x.

As the light deflector according to the control sample of the first embodiment of the present disclosure does not have a folded structure for drive bars, the amount of deformation cannot be accumulated due to a folded structure of the drive bars, unlike the case as illustrated in FIG. 14. For this reason, only a small moment M is generated, and the amount of deformation z at the front end of the drive bar 131x and the rotation angle θ of the mirror unit 110x take smaller values than those of the first embodiment as illustrated in FIG. 14.

As described above, in the light deflector 100 according to the first embodiment of the present disclosure, the amount of deformation is accumulated due to a folded structure of the drive bars to activate a torsion-stress resonant mode of the pair of torsion bars 120a and 120b, and the amplitude of the pair of torsion bars 120a and 120b is greatly increased. As a result, the light deflector 100 with greater amplitude than that of the known configurations can be achieved. Due to the folded structure of the pair of connecting parts 130a and 130b, the pair of connecting parts 130a and 130b can be formed in a compact manner, and thus the light deflector 100 can be downsized. In other words, the light deflector 100 can be downsized, and the amplitude of the light deflector can be increased.

Due to the folded structure of the pair of connecting parts 130a and 130b, even if the amplitude of the drive bars is increased, the stress when the amplitude of the mirror unit 110 is increased can be attenuated.

Figure 16:
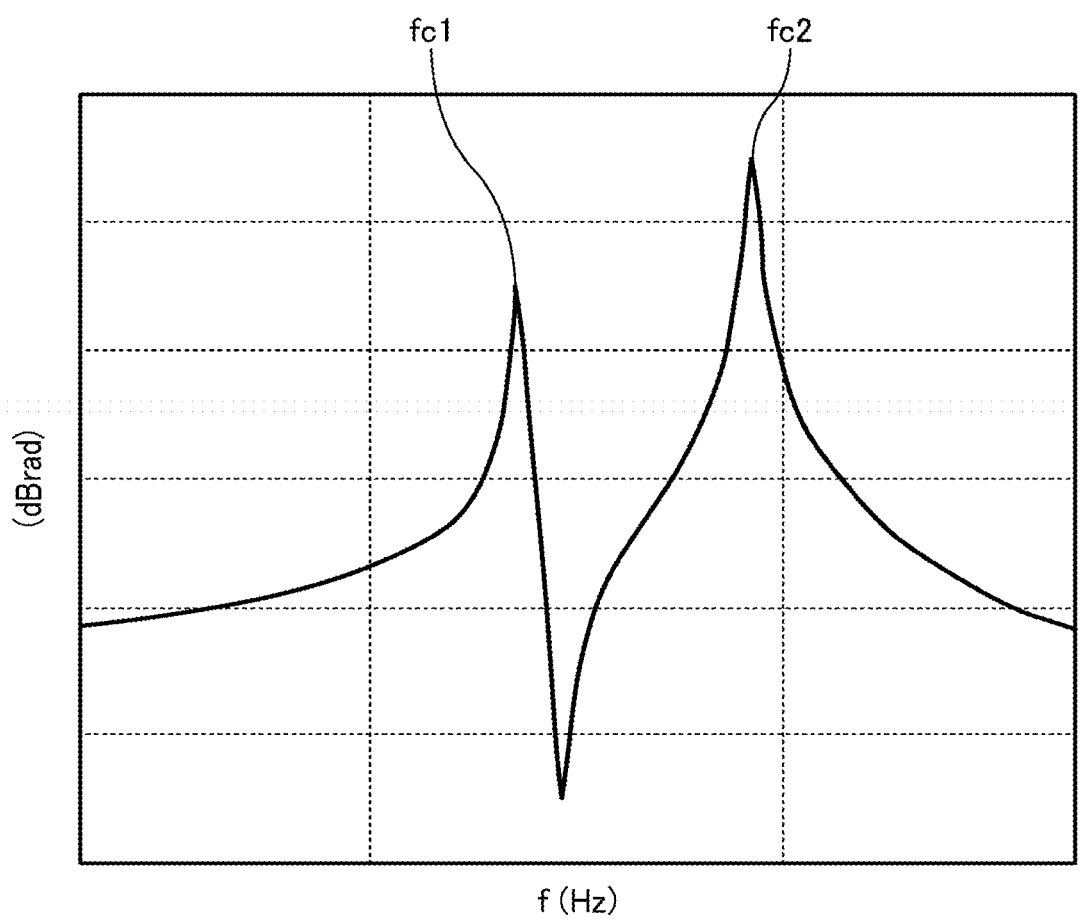
FIG. 16 is a diagram illustrating resonance frequencies according to embodiments of the present disclosure.

FIG. 16 is a diagram illustrating resonance frequencies according to the present embodiment.

In FIG. 16, fc1 indicates the resonance frequency in a primary bending and deformation mode for the connecting part, and fc2 indicates the resonance frequency of the mirror in a torsion-stress deformation mode for the torsion bar. It is desired that the resonance frequency fc1 be close to the resonance frequency fc2. In other words, preferably, the resonance frequency fc1 is set within the frequency range that can excite the resonance of the mirror unit in the torsion-stress deformation mode for the torsion bar, with reference to the resonance frequency fc2. Due to such a configuration and setting, the resonance of the mirror unit (the torsion-stress mode for the torsion bar) can be amplified by the resonance in the primary bending and deformation mode for the connecting part, and the amplitude of the mirror unit can further be increased. When the resonance frequency fc1 be close to the resonance frequency fc2 in the present embodiment, the oscillation mode of the resonance frequency fc1 and the oscillation mode of the resonance frequency fc2 influence one another and coupled oscillations are caused. In such cases, the resonance frequency fc1 can excite the resonance of the mirror unit in the torsion-stress deformation mode for the torsion bar.

Second Embodiment

In a second embodiment of the present disclosure, cases in which only one driver channel is used are described. In the second embodiment, like reference signs are given to elements similar to those of the embodiments as described above, and overlapping description may be omitted.

Figure 17:
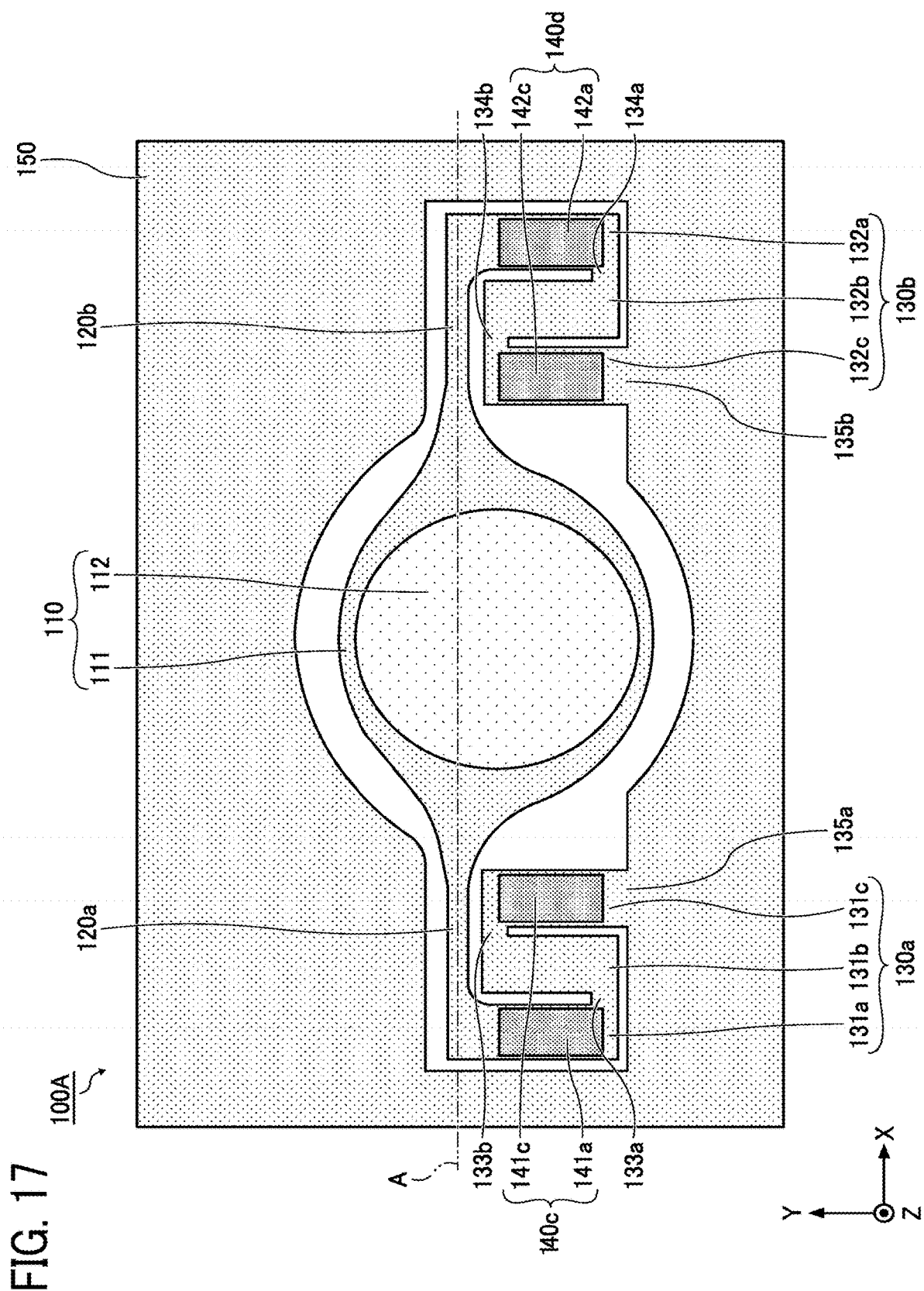
FIG. 17 is a plan view of a light deflector according to a second embodiment of the present disclosure.

FIG. 17 is a plan view of a light deflector 100A according to the second embodiment of the present disclosure.

In FIG. 17, the light deflector 100A is viewed from the front side where the reflection plane can be observed.

A rear perspective view of the light deflector 100A according to the second embodiment of the present disclosure is similar to FIG. 13.

The light deflector 100A as illustrated in FIG. 17 is different from the light deflector 100 (see FIG. 12 and FIG. 13) in the respect that the pair of driving units 140a and 140b are replaced with a pair of driving units 140c and 140d.

The driving unit 140c includes the driving elements 141a and 141c but does not include the driving element 141b. In other words, the driving element 141a is formed for the drive bar 131a that is the first drive bar among a plurality of drive bars when counted from the fixed part 150 side, and the driving element 141c is formed for the drive bar 131c that is the third drive bar among a plurality of drive bars when counted from the fixed part 150 side. However, no driving element is formed for the drive bar 131b that is the second drive bar among a plurality of drive bars when counted from the fixed part 150 side.

In a similar manner to the above, the driving unit 140d includes the driving elements 142a and 142c but does not include the driving element 142b. In other words, the driving element 142a is formed for the drive bar 132a that is the first drive bar among a plurality of drive bars when counted from the fixed part 150 side, and the driving element 142c is formed for the drive bar 132c that is the third drive bar among a plurality of drive bars when counted from the fixed part 150 side. However, no driving element is formed for the drive bar 132b that is the second drive bar among a plurality of drive bars when counted from the fixed part 150 side.

In the light deflector 100A, when voltage is applied to all the driving elements, each of the drive bars can deform and bend backward only to a one side. However, the mirror unit 110 can oscillate to both sides due to a resonant operation.

As described above, due to a resonant operation, the mirror unit 110 can operate to both sides by making use of the deformation to only one side. Accordingly, a driving element may be provided only for at least one odd-numbered drive bar of the folded structure among a plurality of drive bars when counted from the fixed part 150 side, and the mirror unit 110 can oscillate by making use of the deformation to only one side. In such a configuration, it is satisfactory as long as the driving elements are supplied with voltage only from a single channel. Accordingly, it is satisfactory as long as a driver is provided for only one channel, and the driver of the light deflector 100A can be produced at low cost. In cases where a driving element is formed only for at least one even-numbered drive bar among a plurality of drive bars when counted from the fixed part 150 side, similar advantageous effects can be achieved.

Figure 18:
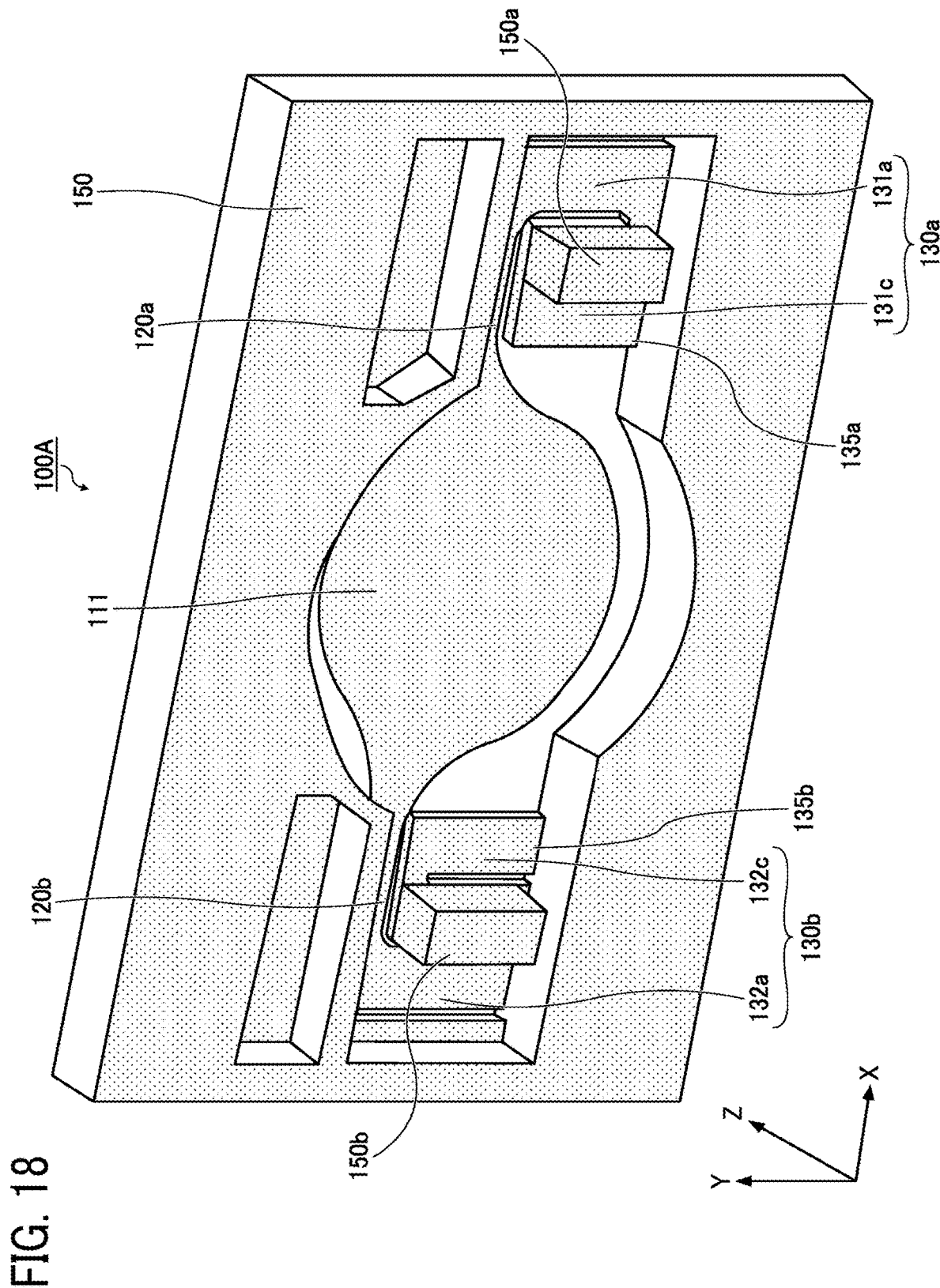
FIG. 18 is a perspective view of a light deflector according to a modification of the second embodiment of the present disclosure.

The resonance frequency in a bending mode for the connecting part tends to be higher when the second drive bar is not deformed. Although it depends on a desired value for the resonance frequency of the mirror unit 110, for example, as illustrated in FIG. 18, a silicon supporting layer may be formed and kept at each area of the second drive bars as a pair of drive-bar supporting layers 150a and 150b each of which serves as a reinforcing material (rib), in order to increase the resonance frequency of the mirror unit 110. For example, the width of each of the pair of drive-bar supporting layers 150a and 150b can be made approximately the same as the width of the drive bar for which each of the pair of drive-bar supporting layers 150a and 150b is provided. In such a configuration, the second drive bar has no influence on the deformation. For this reason, the width of the second drive bar may be made narrower.

As described above, a drive-bar supporting layer that serves as a reinforcing material may be provided for an area of the drive bar for which no driving element is provided. In cases where a driving element is formed only for at least one even-numbered drive bar among a plurality of drive bars when counted from the fixed part 150 side, a drive-bar supporting layer that serves as a reinforcing material may be provided for at least one odd-numbered drive bar among a plurality of drive bars when counted from the fixed part 150 side.

Third Embodiment

In a third embodiment of the present disclosure, cases in which an even number of drive bars are used are described. In the third embodiment, like reference signs are given to elements similar to those of the embodiments as described above, and overlapping description may be omitted.

Figure 19:
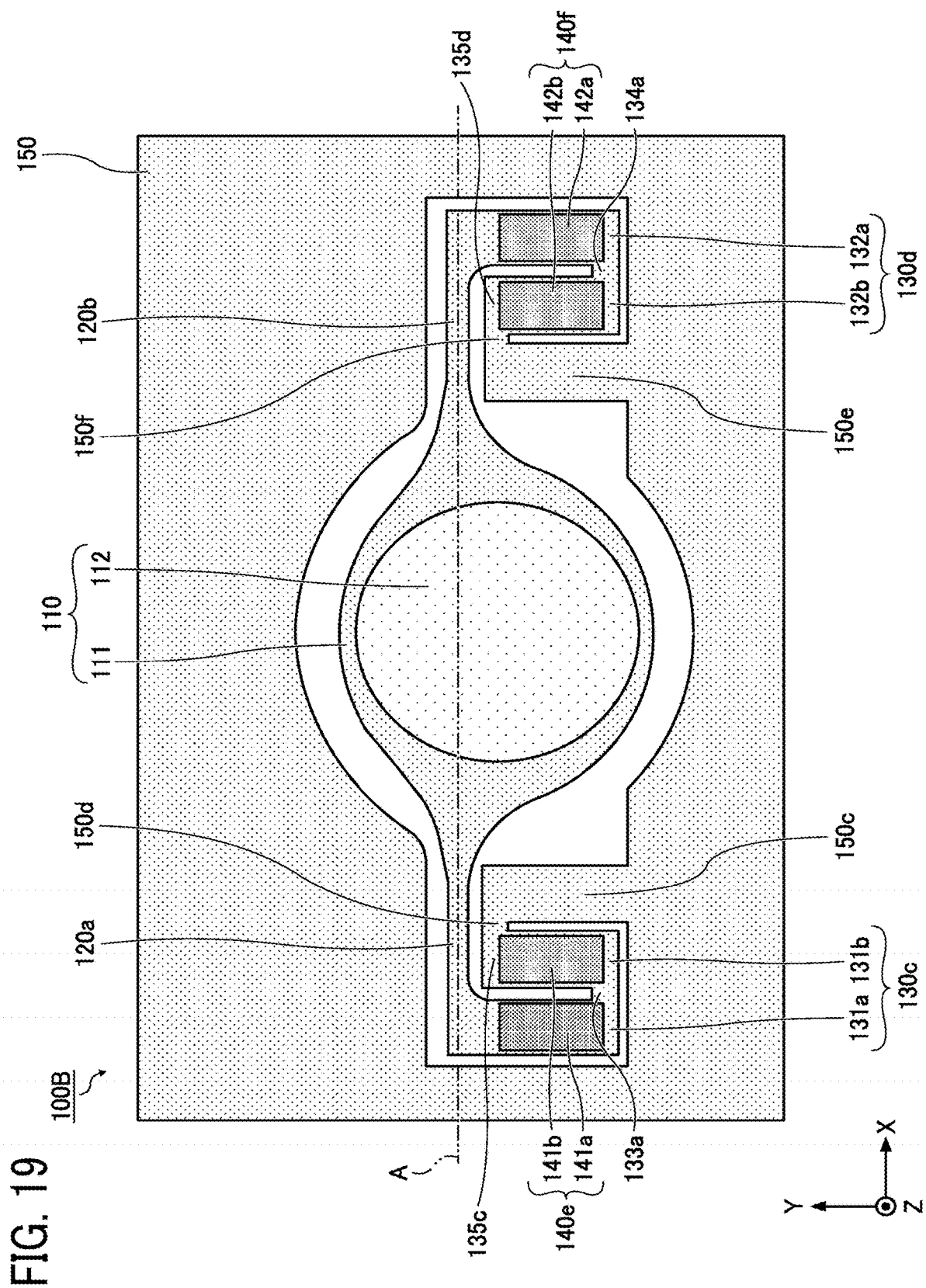
FIG. 19 is a plan view of a light deflector according to a third embodiment of the present disclosure.

FIG. 19 is a plan view of a light deflector 100B according to the third embodiment of the present disclosure.

In FIG. 19, the light deflector 100B is viewed from the front side where the reflection plane can be observed.

Figure 20:
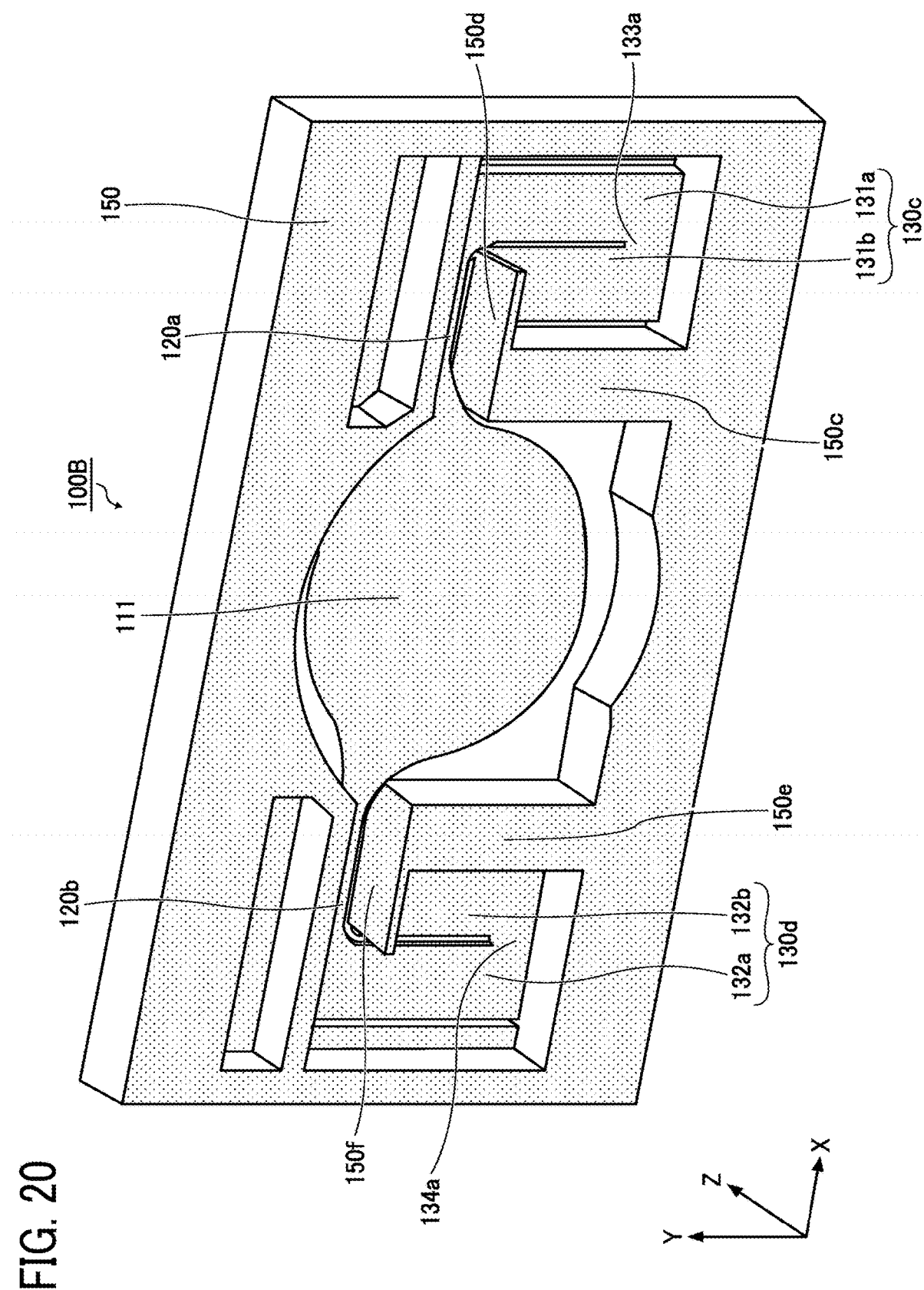
FIG. 20 is a perspective view of a light deflector according to the third embodiment of the present disclosure.

FIG. 20 is a rear perspective view of the light deflector 100B according to the third embodiment of the present disclosure.

The light deflector 100B as illustrated in FIG. 19 and FIG. 20 is different from the light deflector 100 (see FIG. 12 and FIG. 13) in the respect that the pair of connecting parts 130a and 130b are replaced with a pair of connecting parts 130c and 130d and that the pair of driving units 140a and 140b are replaced with a pair of driving units 140e and 140f.

The connecting part 130c includes the drive bars 131a and 131b but does not include the drive bar 131c. An extension 150c that extends towards the torsion bar 120a from an inner side of the fixed part 150 is formed at the position of the drive bar 131c of the light deflector 100 (see FIG. 12). The longer-side direction of the extension 150c is in the direction perpendicular to the axis A. Moreover, in the present embodiment, an extension 150d that extends from the edge of the extension 150c on the torsion bar 120a side in parallel with the torsion bar 120a is formed. The longer-side direction of the extension 150c is in the direction parallel to the axis A. For example, the extensions 150c and 150d are composed of a silicon supporting layer, an oxidized silicon layer, and a silicon active layer. Such extensions 150c and 150d are molded integrally with the fixed part 150.

The drive bars 131a and 131b are coupled to turn through a coupler. In other words, the drive bars 131a and 131b have a folded structure. More specifically, the end of the drive bar 131a on the +Y side is coupled to the end of the torsion bar 120a on the other side of the mirror-unit base 111. Alternatively, the end of the drive bar 131a on the −Y side is coupled to the end of the drive bar 131b on the −Y side through a coupler 133a. The end of the drive bar 131b on the +Y side is coupled to the end of the extension 150c on the +Y side through the extension 150d. The end of the extension 150c on the −Y side is coupled to an inner side of the fixed part 150.

In a similar manner to the above, the connecting part 130d includes the drive bars 132a and 132b but does not include the drive bar 132c. An extension 150e that extends towards the torsion bar 120b from an inner side of the fixed part 150 is formed at the position of the drive bar 132c of the light deflector 100 (see FIG. 12). The longer-side direction of the extension 150e is in the direction perpendicular to the axis A. Moreover, the extension 150f that extends in parallel with the torsion bar 120b from the edge of the extension 150e on the torsion bar 120b side is formed. The longer-side direction of the extension 150f is in the direction parallel to the axis A is arranged. For example, the extensions 150e and 150f are composed of a silicon supporting layer, an oxidized silicon layer, and a silicon active layer. Such extensions 150e and 150f are molded integrally with the fixed part 150.

The drive bars 132a and 132b are coupled to turn through a coupler. In other words, the drive bars 132a and 132b have a folded structure. More specifically, the end of the drive bar 132a on the +Y side is coupled to the end of the torsion bar 120b on the other side of the mirror-unit base 111. Alternatively, the end of the drive bar 132a on the −Y side is coupled to the end of the drive bar 132b on the −Y side through a coupler 134a. The end of the drive bar 132b on the +Y side is coupled to the end of the extension 150e on the +Y side through the extension 150f. The end of the extension 150e on the −Y side is coupled to an inner side of the fixed part 150.

The driving unit 140e includes the driving elements 141a and 141b but does not include the driving element 141c. In other words, the driving element 141a is formed for the drive bar 131a that is the first drive bar among a plurality of drive bars when counted from the fixed part 150 side, and the driving element 141b is formed for the drive bar 131b that is the second drive bar among a plurality of drive bars when counted from the fixed part 150 side.

In a similar manner to the above, the driving unit 140f includes the driving elements 142a and 142b but does not include the driving element 142c. In other words, the driving element 142a is formed for the drive bar 132a that is the first drive bar among a plurality of drive bars when counted from the fixed part 150 side, and the driving element 142b is formed for the drive bar 132b that is the second drive bar among a plurality of drive bars when counted from the fixed part 150 side.

In the present embodiment, a set of odd-numbered drive bars when counted from the fixed part 150 side and a set of even-numbered drive bars when counted from the fixed part 150 side are alternately driven in the reversed-phase. As a result, the mirror unit 110 can oscillate.

In a similar manner to the light deflector 100 according to the first embodiment of the present disclosure, when the resonance frequency at the connecting part in a primary bending mode is configured at a resonance frequency close to the resonance frequency of the mirror in a torsion-stress deformation mode for the torsion bar, the resonance of the mirror unit (the torsion-stress mode for the torsion bar) can be amplified by the resonance in the primary bending and deformation mode for the connecting part. Accordingly, the amplitude of the mirror unit can further be increased.

As described above, when the number of drive bars at a connecting part is made to be an even number, the fixed edges 135c and 135d of the connecting part are positioned near the center of the fixed part 150. As a result, the oscillation of the fixed part 150 due to the reflection force of the operation of the mirror unit 110 can be prevented. In the present embodiment, the fixed edge 135c is a connecting portion at which the extension 150d is coupled to the drive bar 131b, and the fixed edge 135d is a connecting portion at which the extension 150f is coupled to the drive bar 132b.

Figure 21:
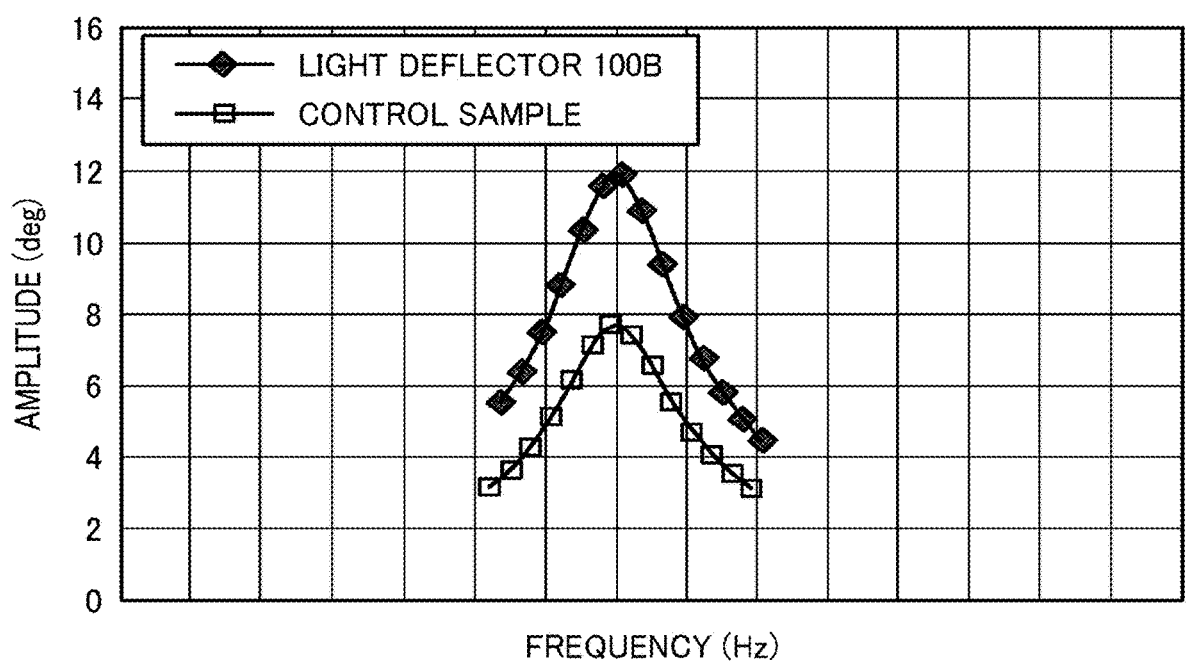
FIG. 21 is a diagram illustrating the frequency response characteristics around the drive frequency of a mirror, according to the third embodiment of the present disclosure.

FIG. 21 is a diagram illustrating the frequency response characteristics around the drive frequency of the mirror, and it is understood from FIG. 21 that the angles of amplitude that are achieved by the light deflector 100B are greater than the angles of amplitude that are achieved by a control sample where only a single drive bar is used.

Fourth Embodiment

In the fourth embodiment of the present disclosure, a biaxial light deflector 200 with the light deflector 100 according to the first embodiment of the present disclosure is described. In the fourth embodiment, like reference signs are given to elements similar to those of the embodiments as described above, and overlapping description may be omitted. In the present embodiment, the main scanning refers to the optical scanning performed around the axis A that is a center of rotation, and the sub-scanning refers to the optical scanning performed around the axis B that is another center of rotation.

Figure 22:
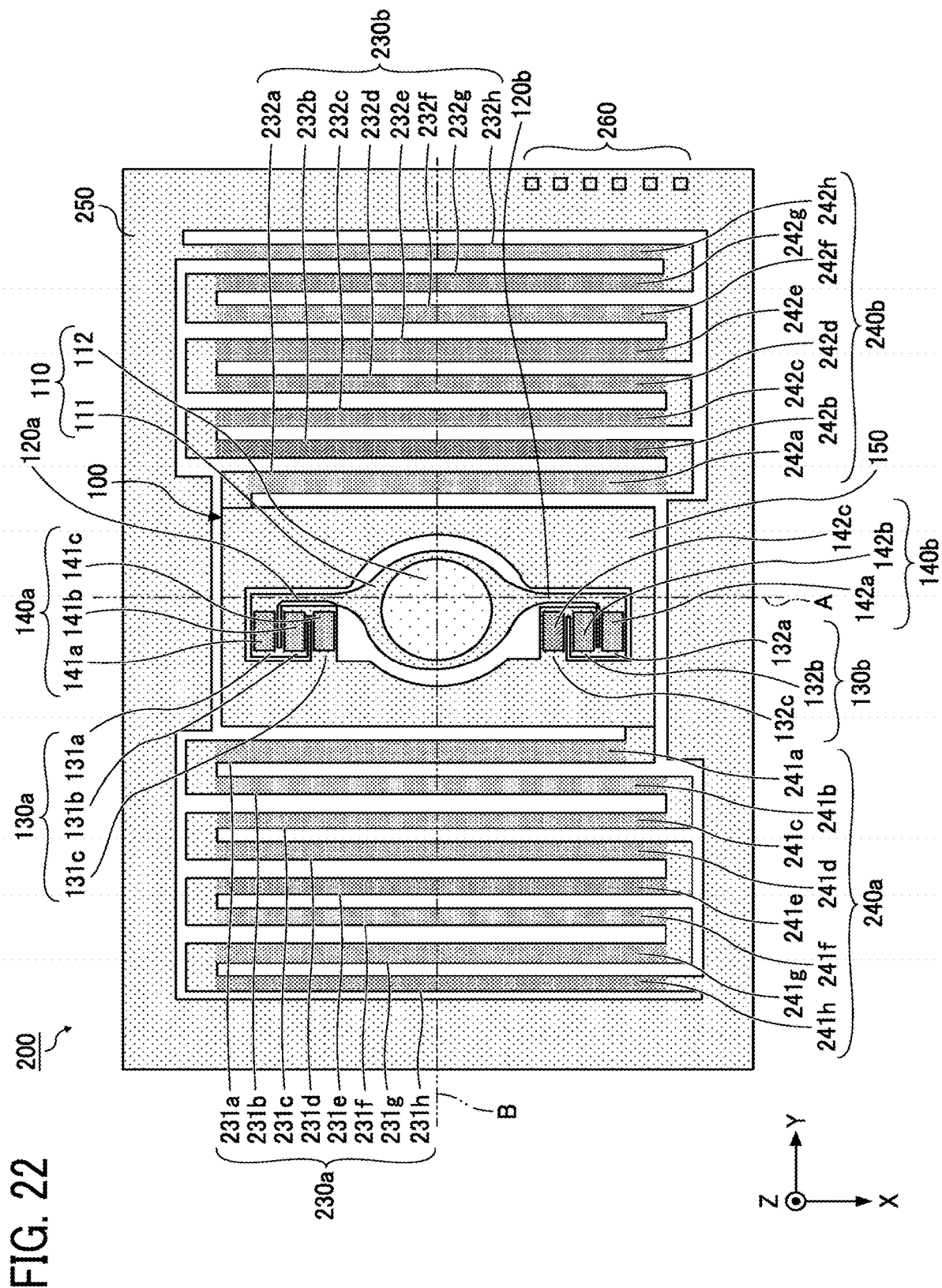
FIG. 22 is a plan view of a light deflector according to a fourth embodiment of the present disclosure.

FIG. 22 is a plan view of the light deflector 200 according to the fourth embodiment of the present disclosure.

The light deflector 200 as illustrated in FIG. 22 rotates the movable part provided with a reflection plane to biaxially deflect the light that is incident on the reflection plane around the axis A and the axis B.

The light deflector 200 is provided with a configuration or structure to enable the rotation of the mirror unit 110 around the axis A that corresponds to the main scanning direction and the rotation of the mirror unit 110 around the axis B that corresponds to the sub-scanning direction. In other words, as the mirror unit 110 biaxially rotates, the light deflector 200 can deflect the incident light while biaxially scanning the incident light. In the light deflector 200, the light deflector 100 is used in the main scanning direction (high-speed axis). The structure of the light deflector 200 is described below in detail.

The light deflector 200 includes the light deflector 100 according to the first embodiment of the present disclosure, a fixed part 250 that is arranged in the outer regions of the fixed part 150, a pair of connecting parts 230a and 230b that couple the fixed part 150 to the fixed part 250, a pair of driving units 240a and 240b that deform the pair of connecting parts 230a and 230b, and an electrode connecting part 260. The pair of driving units 140a and 140b deform the pair of connecting parts 130a and 130b. As a result, the movable part oscillates around the axis A that is perpendicular to the bending directions of the pair of connecting parts 130a and 130b. The pair of driving units 240a and 240b deform the pair of connecting parts 230a and 230b. As a result, the movable part oscillates around an axis B that is perpendicular to the axis A.

For example, the light deflector 200 is molded by etching a sheet of silicon on insulator (SOI) substrate. On such a molded SOI substrate, for example, the reflection plane 112 or the pair of driving units 140a and 140b, the pair of driving units 240a and 240b, and the electrode connecting part 260 are formed. As a result, these elements are integrally molded. The above-described multiple elements may be formed after the SOI substrate is molded, or may be formed while the SOI substrate is being molded.

Note also that the SOI substrate does not always have to be planar, and may have, for example, curvature. As long as the substrate can be integrally processed by etching or the like and can be partially elastic, the member used for forming the light deflector 200 is not limited to the SOI substrate.

The connecting part 230a includes strip-shaped drive bars 231a, 231b, 231c, 231d, 231e, 231f, 231g, and 231h whose longer-side directions are in the direction perpendicular to the axis B (i.e., the direction parallel to the X-axis). These drive bars 231a, 231b, 231c, 231d, 231e, 231f, 231g, and 231h are coupled to turn through a coupler. In other words, drive bars 231a, 231b, 231c, 231d, 231e, 231f, 231g, and 231h have a folded structure. One end of the drive bar 231a is coupled to an outer region of the fixed part 150 of the light deflector 100, and one end of the drive bar 231h is coupled to an inner side of the fixed part 250.

In a similar manner to the above, the connecting part 230b includes strip-shaped drive bars 232a, 232b, 232c, 232d, 232e, 232f, 232g, and 232h whose longer-side direction is in the direction perpendicular to the axis B (i.e., the direction parallel to the X-axis). These drive bars 232a, 232b, 232c, 232d, 232e, 232f, 232g, and 232h are coupled to turn through a coupler. In other words, drive bars 232a, 232b, 232c, 232d, 232e, 232f, 232g, and 232h have a folded structure. One end of the drive bar 232a is coupled to an outer region of the fixed part 150 of the light deflector 100, and one end of the drive bar 232h is coupled to an inner side of the fixed part 250.

In this configuration, for example, the connecting portion at which the connecting part 230a is coupled to the fixed part 150 of the light deflector 100 and the connecting portion at which the connecting part 230b is coupled to the fixed part 150 of the light deflector 100 may be symmetrical in pairs across the point of symmetry that is the center of the reflection plane 112. Moreover, for example, the connecting portion at which the connecting part 230a is coupled to the fixed part 250 and the connecting portion at which the connecting part 230b is coupled to the fixed part 250 may be symmetrical in pairs across the point of symmetry that is the center of the reflection plane 112.

The driving unit 240a is formed on the front side of the connecting part 230a, where the reflection plane 112 formed, and such a configuration establishes a unimorph structure. The driving unit 240b is formed on the front side of the connecting part 230b, and such a configuration establishes a unimorph structure.

The driving unit 240a includes a plurality of strip-shaped driving elements 241a, 241b, 241c, 241d, 241e, 241f, 241g, and 241h whose longer-side directions are in the direction perpendicular to the axis B (i.e., the direction parallel to the X-axis). The driving elements 241a to 241h are formed on the front sides of the drive bar 231a to 231h, respectively.

In a similar manner to the above, the driving unit 240a includes a plurality of strip-shaped driving elements 242a, 242*b*, 242*c*, 242*d*, 242*e*, 242*f*, 242*g*, and 242*h* whose longer-side directions are in the direction perpendicular to the axis B (i.e., the direction parallel to the X-axis). The driving elements 242*a* to 242*h* are formed on the front sides of the drive bar 232*a* to 232*h*, respectively.

Each one of the driving elements 241*a* to 241*h* and the driving elements 242*a* to 242*h* is a piezoelectric element, and includes, for example, a lower electrode, a piezoelectric circuit, and an upper electrode that are formed in this order on the +Z surface of the silicon active layer that serves as an elastic member. For example, each of the upper electrode and the lower electrode may be made of gold (Au) or platinum (Pt). For example, the piezoelectric circuit may be made of lead zirconate titanate (PZT), which is a piezoelectric material.

In the present embodiment, a set of odd-numbered drive bars among the drive bars 131*a* to 131*c* and 132*a* to 132*c* when counted from the fixed part 150 side and a set of even-numbered drive bars among the drive bars 131*a* to 131*c* and 132*a* to 132*c* when counted from the fixed part 150 side are alternately driven in the reversed-phase. As a result, the mirror unit 110 can oscillate around the axis A. In the present embodiment, a set of odd-numbered drive bars among the drive bars 231*a* to 231*h* and 232*a* to 232*h* when counted from the fixed part 250 side and a set of even-numbered drive bars among the drive bars 231*a* to 231*h* and 232*a* to 232*h* when counted from the fixed part 250 side are alternately driven in the reversed-phase. As a result, the mirror unit 110 can oscillate around the axis B. In other words, the mirror unit 110 may oscillate so as to biaxially deflect the light that is incident on the reflection plane 112 around the axis A and the axis B.

For example, the fixed part 250 is a rectangular-shaped supporting structure formed to surround the fixed part 150 of the light deflector 100. For example, the fixed part 250 is composed of a silicon supporting layer, an oxidized silicon layer, and a silicon active layer. Note also that it is not necessary for the fixed part 250 to be formed so as to surround the fixed part 150 of the light deflector 100 in a complete manner. For example, an open area may be arranged in the up-and-down directions in FIG. 22.

For example, the electrode connecting parts 260 are formed on the surface of the fixed part 250 on the +Z side. The electrode connecting parts 260 are electrically connected to the upper electrode and the lower electrode of each one of the driving elements 141*a* to 141*c*, 142*a* to 142*c*, 241*a* to 241*h*, and 242*a* to 242*h* through electrode wiring of aluminum (Al) or the like. The electrode connecting part 260 is electrically connected to for example, a controller provided outside the light deflector 200. Each of the upper electrodes and lower electrodes may be directly connected to the electrode connecting parts 260. Alternatively, in some embodiments, the upper electrodes and lower electrodes may be indirectly connected to the electrode connecting parts 260 through a wire or the like that connects a pair of electrodes.

In the present embodiment, the driving unit 240*a* is formed on the front side of the connecting part 230*a*, and the driving unit 240*b* is formed on the front side of the connecting part 230*b*. However, no limitation is indicated thereby, and the driving unit may be arranged on the rear side (i.e., the plane on the −Z side) of the pair of connecting parts, or may be arranged on both the front side and rear side of the pair of connecting parts.

The shapes of the components are not limited to the shapes in the present embodiment as long as the mirror unit 110 can be driven around the axis A and the axis B. For example, the torsion bars 120*a* and 120*b* and the connecting parts 130*a* and 130*b* may have a shape with curvature.

Furthermore, an insulating layer that is made of, for example, a oxidized silicon layer may be formed on at least one of the +Z surface of the upper electrode of the driving units 240*a* and 240*b* and the +Z surface of the fixed part 250.

In this case, electrode wiring is provided on the insulating layer, and the insulating layer is partially removed as an opening or is not formed at a connection spot where the upper electrode or the lower electrode and the electrode wiring are coupled to each other, so that the driving units 240*a* and 240*b* and the electrode wiring can be designed with an improved degree of freedom, and furthermore, a short circuit as a result of contact between electrodes can be controlled. The oxidized silicon layer may serve as antireflection coating.

As described above, the light deflector 200 that is biaxially configured can be achieved using the light deflector 100 according to the first embodiment of the present disclosure. In the light deflector 100, the pair of connecting parts 130*a* and 130*b* can be formed in a compact manner. For this reason, the weight of the light deflector 100 that serves as a movable part can be reduced in a biaxial configuration, and the resonance frequency in the sub-scanning direction (low-speed axis) can be increased. Accordingly, the intensity of the voltage that is applied to the driving units 240*a* and 240*b* can be reduced.

Alternatively, the light deflector 100 may be replaced with the light deflector 100A or the light deflector 100B. In particular, when the light deflector 100B is used in the main scanning direction (high-speed axis) in the light deflector 200, the fixed edges 135*c* and 135*d* of the connecting part are positioned near the center of the fixed part 150. As a result, the oscillation of the fixed part 150 due to the reflection force of the operation of the mirror unit 110 can be prevented.

In other words, as the fixed edges 135*c* and 135*d* are made close to the central axis of the rotation of the mirror unit 110 in a direction perpendicular to the pair of torsion bars 120*a* and 120*b*, the generation of a moment, which could affect the fixed part 150, due to the reflection force of the operation can be prevented, and unwanted vibration, which could the fixed part, due to the reflection force caused during the driving operation can be reduced. Accordingly, long amplitude can be achieved with high stability.

In the light deflector 200, for example, raster scanning may be used as a scanning method of two-dimensionally scanning a light beam. In other words, in a direction around the axis A, the mirror unit 110 is scanned using, for example, a high-speed (several kilohertz (kHz) to tens of kHz) sinusoidal signal in view of an exciting frequency in a resonant-mode of the light deflector 100. On the other hand, in a direction around the axis B, the mirror unit 110 is scanned using, for example, a low-speed (several tens of hertz (Hz)) driving signal in a sawtooth waveform. For example, in an imaging device that uses laser-beam scanning, laser beams are flashed based on the image data in view of the scanning angle of the mirror unit 110. By so doing, an image can be drawn.

Fifth Embodiment

In addition to a reinforcing material as described above in the second embodiment of the present disclosure, a variation of such a reinforcing material according to a fifth embodiment of the present disclosure is described below. In the fifth embodiment, like reference signs are given to elements similar to those of the embodiments as described above, and overlapping description may be omitted.

Figure 23:
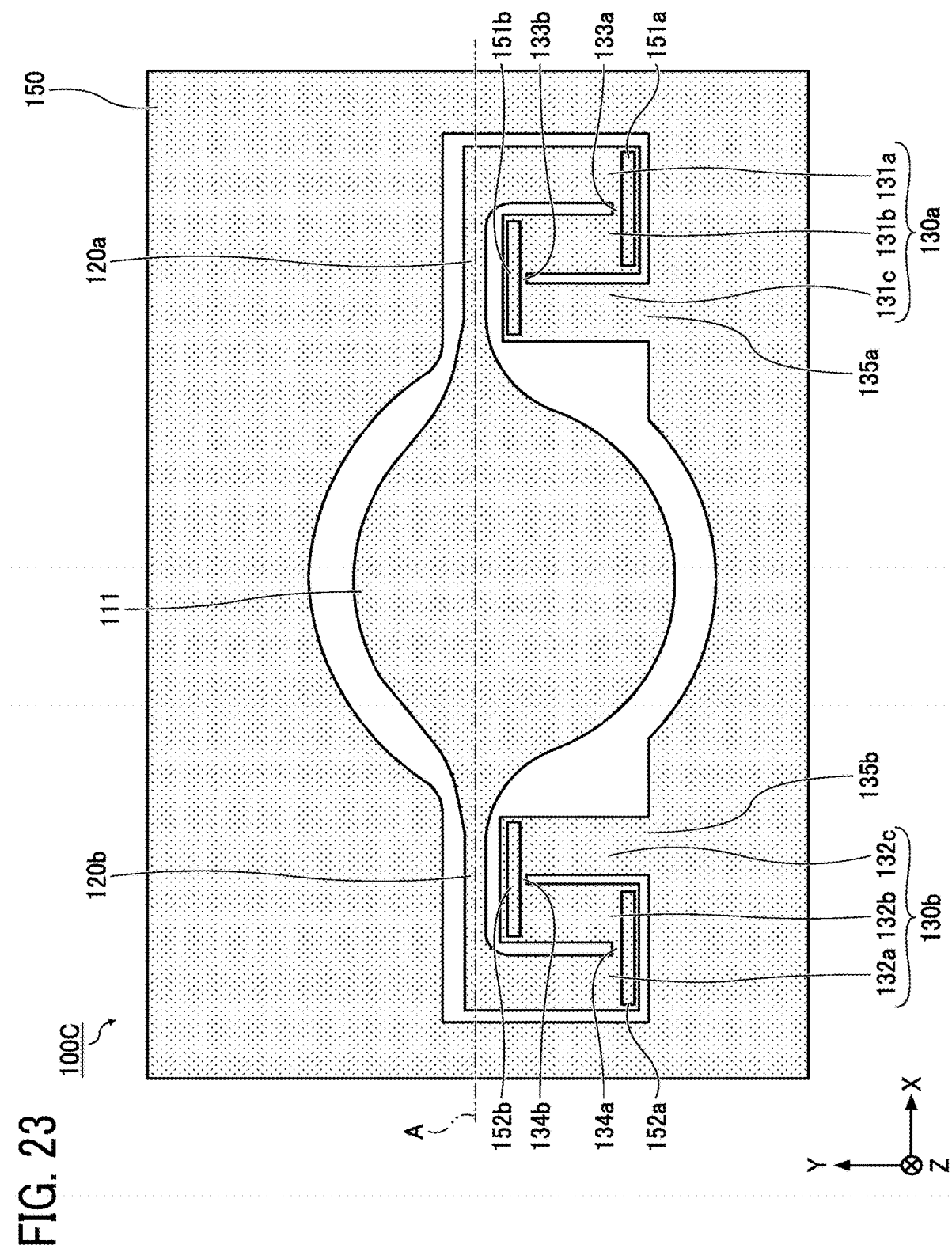
FIG. 23 is a plan view of a light deflector according to a fifth embodiment of the present disclosure.

FIG. 23 is a rear plan view of a light deflector 100C according to the fifth embodiment of the present disclosure.

Figure 24:
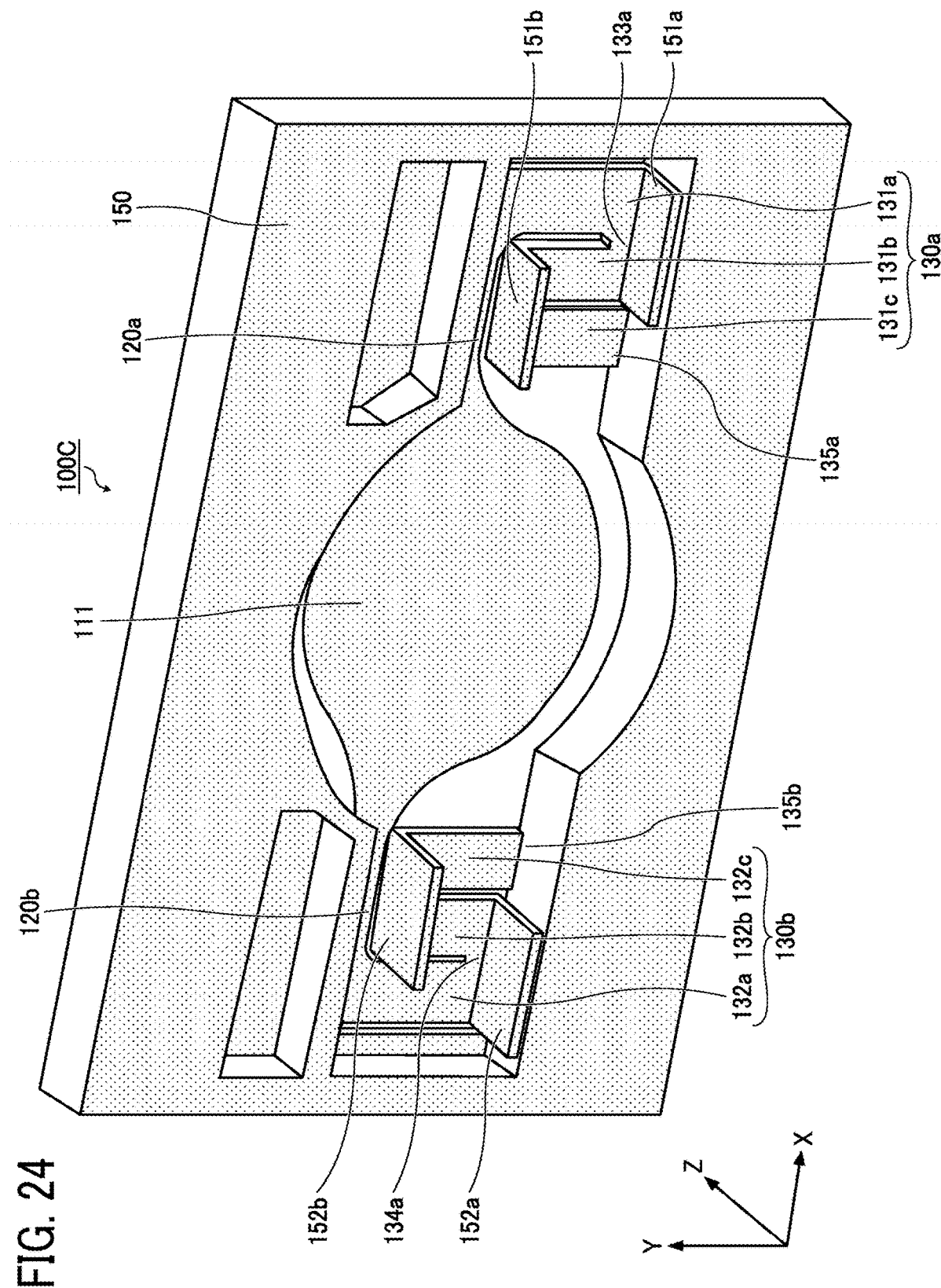
FIG. 24 is a perspective view of a light deflector according to the fifth embodiment of the present disclosure.

FIG. 24 is a rear perspective view of the light deflector 100C according to the fifth embodiment of the present disclosure.

A front plan view of the light deflector 100C according to the fifth embodiment of the present disclosure is similar to FIG. 12. In other words, the driving unit 140a that includes the driving elements 141a, 141b, and 141c are formed on the front side of the connecting part 130a, and the driving unit 140b that includes the driving elements 142a, 142b, and 142c are formed on the front side of the connecting part 130b.

In the connecting part 130a of the light deflector 100C as illustrated in FIG. 23 and FIG. 24, a pair of coupler supporting layers 151a and 151b, each of which serves as a reinforcing material (rib), are arranged on the rear side of the coupler 133a that couples the drive bar 131a to the drive bar 131b and the coupler 133b that couples the drive bar 131b to the drive bar 131c, respectively. In a similar manner, in the connecting part 130b, a pair of coupler supporting layers 152a and 152b, each of which serves as a reinforcing material (rib), are arranged on the rear side of the coupler 134a that couples the drive bar 132a to the drive bar 132b and the coupler 134b that couples the drive bar 132b to the drive bar 132c, respectively.

The pair of coupler supporting layers 151a and 151b and the pair of coupler supporting layers 152a and 152b whose longer-side directions are in the direction parallel to the axis A (i.e., the direction parallel to the X-axis) are formed in a long slender shape, and protrude from the rear side of the coupler of the neighboring drive bar in the −Z direction. For example, the pair of coupler supporting layers 151a and 151b and the pair of coupler supporting layers 152a and 152b are made of a silicon supporting layer.

It is desired that the pair of connecting parts 130a and 130b bend and deform in a simple manner. However, in actuality, twisting deformation is caused to the pair of connecting parts 130a and 130b as influenced by the power of the drive bars that are adjacent to each other in a folded structure. If the intensity of the voltage that is applied to the driving elements 141a to 141c and 142a to 142c is increased to increase the amplitude of the mirror unit 110, the degree of twisting deformation may increase and the pair of connecting parts 130a and 130b may be broken.

In order to handle such a situation, in the light deflector 100C, the pair of coupler supporting layers 151a and 151b and the pair of coupler supporting layers 152a and 152b are arranged on the rear side of the pair of connecting parts 130a and 130b in order to control the twisting deformation of the pair of connecting parts 130a and 130b. Due to such a configuration, even if the intensity of the voltage that is applied to the driving elements 141a to 141c and 142a to 142c is increased, the possibility that the pair of connecting parts 130a and 130b of a meandering structure are damaged can be reduced. As a result, the degree of breaking-limit angle can be increased, and the amplitude of the mirror unit 110 can be increased accordingly.

The same applies to the configuration provided with the driving unit 140c that includes the driving elements 141a and 141c but does not include the driving element 141b and the driving unit 140d that includes the driving elements 142a and 142c but does not include the driving element 142b as in the light deflector 100A as illustrated in FIG. 17.

In other words, if the configuration as in the light deflector 100A as illustrated in FIG. 17 is provided with the pair of coupler supporting layers 151a and 151b and the pair of coupler supporting layers 152a and 152b as illustrated in FIG. 23 and FIG. 24, twisting deformation of the pair of connecting parts 130a and 130b can efficiently be controlled. Due to such a configuration, even if the intensity of the voltage that is applied to the driving elements 141a and 141c as well as the driving elements 142a and 142c is increased, the possibility that the pair of connecting parts 130a and 130b of a meandering structure are damaged can be reduced. As a result, the degree of breaking-limit angle can be increased, and the amplitude of the mirror unit 110 can be increased accordingly.

Figure 25:
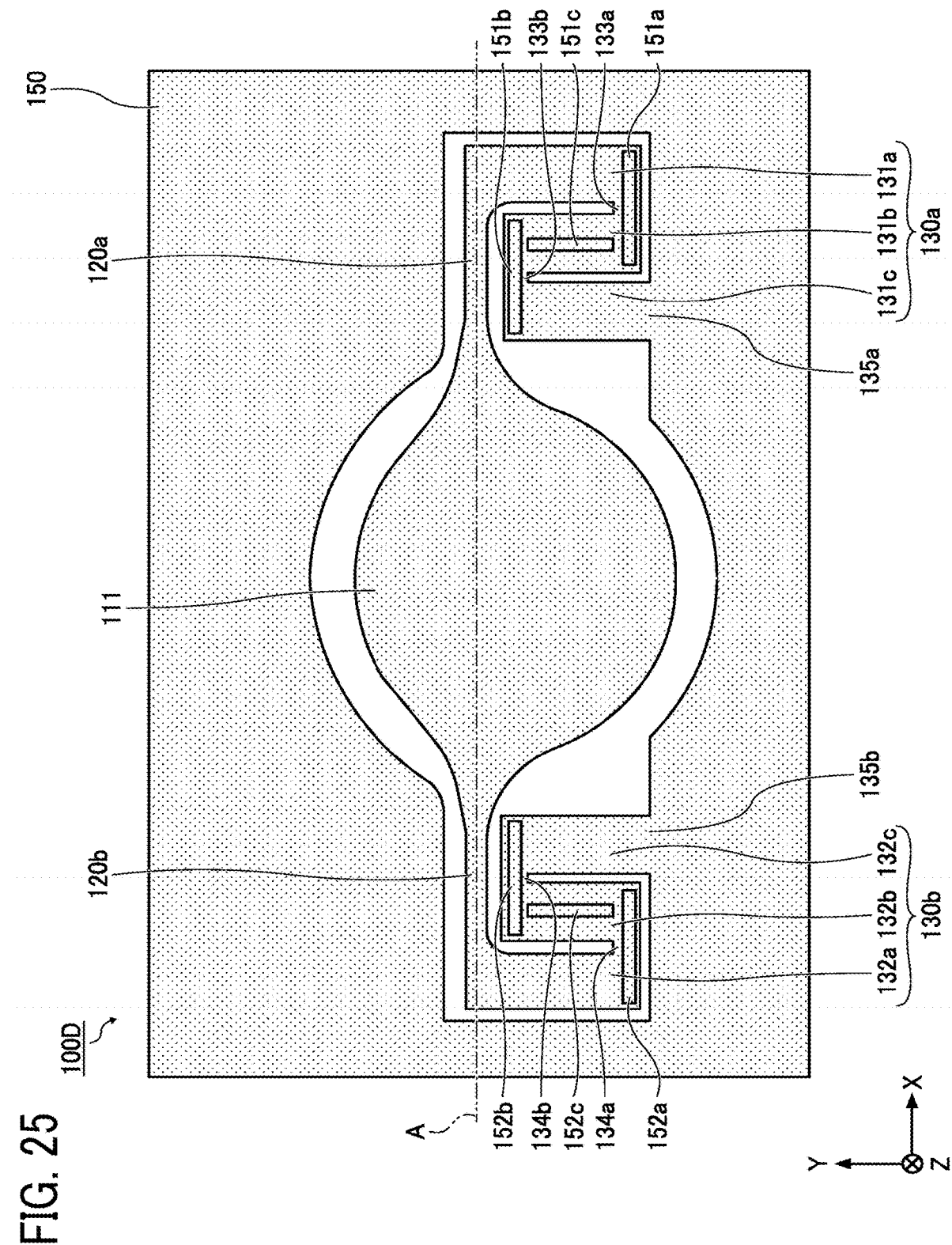
FIG. 25 is a plan view of a light deflector according to a first modification of the fifth embodiment of the present disclosure.

Alternatively, as in the light deflector 100D as illustrated in FIG. 25, a pair of drive-bar supporting layers 151c and 152c that are formed in a long slender shape may be arranged in addition to the pair of coupler supporting layers 151a and 151b and the pair of coupler supporting layers 152a and 152b. The longer-side directions of such a pair of drive-bar supporting layers 151c and 152c are in a direction perpendicular to the axis A (i.e., the direction parallel to the Y-axis). The drive-bar supporting layer 151c protrudes from the rear side of the drive bar 131b in the −Z direction, and the drive-bar supporting layer 152c protrudes from the rear side of the drive bar 132b in the −Z direction. For example, the pair of drive-bar supporting layers 151c and 152c are made of a silicon supporting layer. For example, the width of each of the pair of drive-bar supporting layers 151c and 152c is narrower than the width of the drive bar for which each of the pair of drive-bar supporting layers 151c and 152c is provided.

As in the light deflector 100D as illustrated in FIG. 25, a drive-bar supporting layer that is not linked to a coupler supporting layer that is arranged on the rear side of the coupler may be arranged on the rear side of the drive bar. Due to such a configuration, the twisting deformation of the pair of connecting parts 130a and 130b of a meandering structure can efficiently be controlled, and the pair of connecting parts 130a and 130b can be prevented from being damaged, compared with a configuration in which either one of a coupler supporting layer that is arranged on the rear side of the coupler and a drive-bar supporting layer that is arranged on the rear side of the drive bar is arranged. As a result, the degree of breaking-limit angle can be increased, and the amplitude of the mirror unit 110 can be increased accordingly. Moreover, as the rigidity or solidity to the pair of connecting parts 130a and 130b increases compared with the supporting-layer structure as illustrated in FIG. 23, the resonance frequency can be increased.

Figure 26:
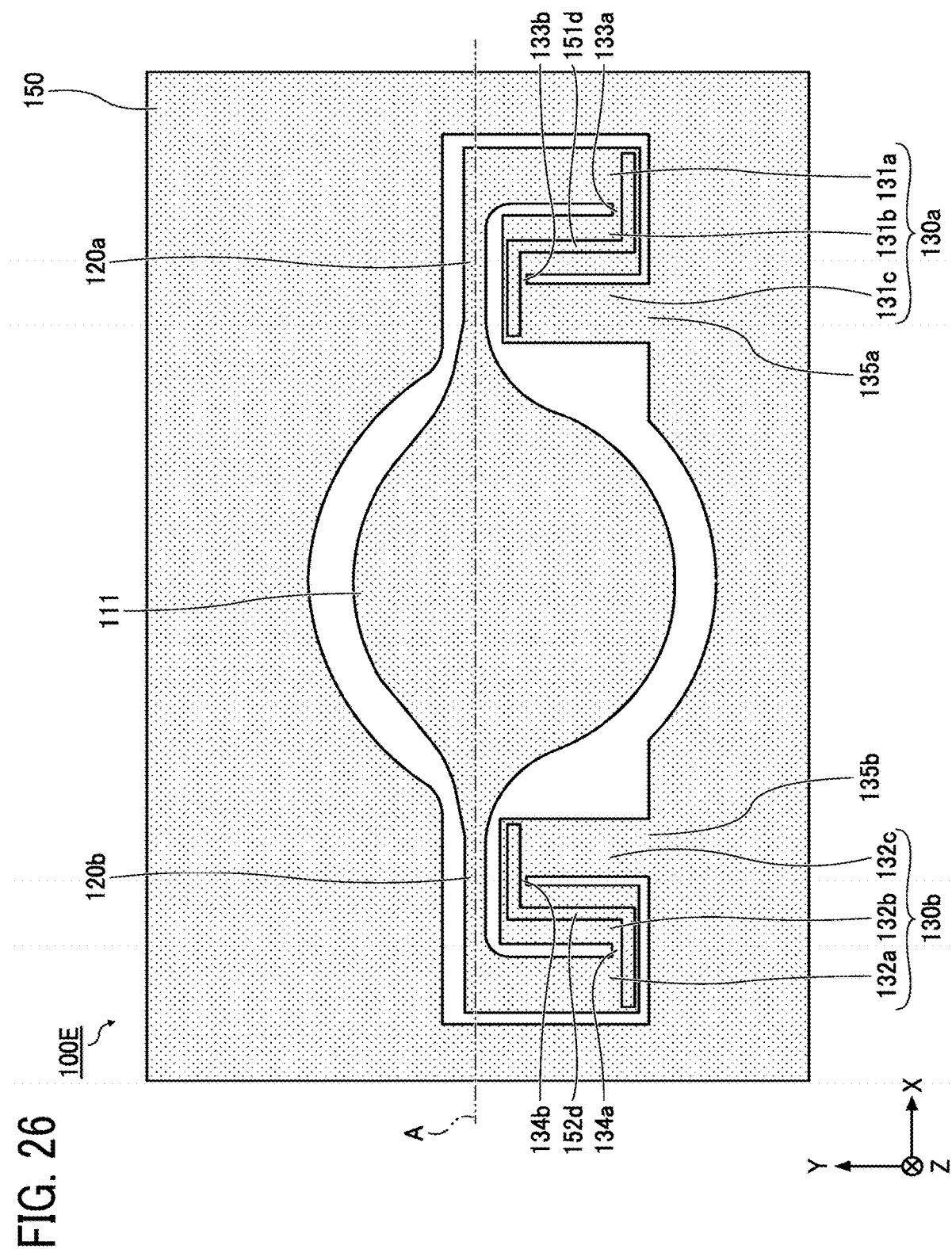
FIG. 26 is a plan view of a light deflector according to a second modification of the fifth embodiment of the present disclosure.

As in the light deflector 100E as illustrated in FIG. 26, the pair of coupler supporting layers 151a and 152b and the drive-bar supporting layer 151c as illustrated in FIG. 25 may be connected to each other to implement a single continuous supporting layer 151d, and the pair of coupler supporting layers 152a and 152b and the drive-bar supporting layer 152c as illustrated in FIG. 25 may be connected to each other to implement a single continuous supporting layer 152d. Due to such a configuration, the twisting deformation of the pair of connecting parts 130a and 130b of a meandering structure can further efficiently be controlled, and the pair of connecting parts 130a and 130b can further be prevented from being damaged, compared with a configuration in which a drive-bar supporting layer that is not linked to a coupler supporting layer that is arranged on the rear side of the coupler is arranged on the rear side of the drive bar as in the light deflector 100D as illustrated in FIG. 25. As a result, the degree of breaking-limit angle can further be increased, and the amplitude of the mirror unit 110 can further be increased accordingly. Moreover, when the supporting-layer structure as illustrated in FIG. 26 is adopted, the twisting deformation of the pair of connecting parts 130a and 130b can further efficiently be controlled compared with when the supporting-layer structure as illustrated in FIG. 25 is adopted. As a result, the resonance frequency can further be increased.

FIG. 27A to FIG. 27F are diagrams each illustrating a result of simulation indicative of the effect of a supporting layer, according to the seventh embodiment of the present disclosure.

Figure 27A:
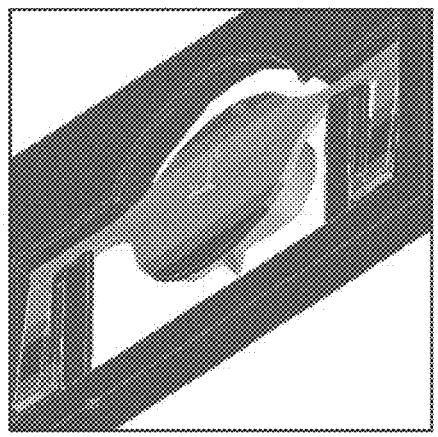
FIG. 27A to FIG. 27F are diagrams each illustrating a result of simulation indicative of the effect of a supporting layer, according to the fifth embodiment of the present disclosure.
Figure 27B:
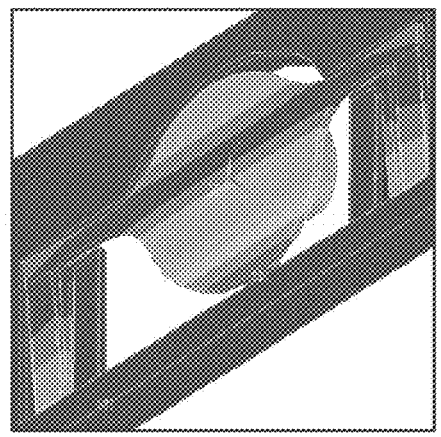
Figure 27C:
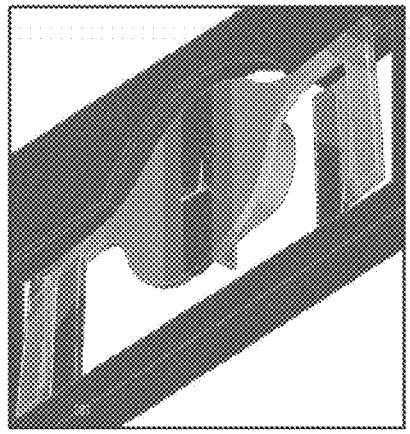

In FIG. 27A to FIG. 27C, results of simulation of three major modes according to the fifth embodiment of the present disclosure are illustrated when a coupler supporting layer is not arranged on the rear side of either one of the connecting parts and the drive bars as illustrated in FIG. 13. By contrast, in FIG. 27 to FIG. 27F, results of simulation of three major modes according to the fifth embodiment of the present disclosure are illustrated when the supporting layers 151d and 152d as illustrated in FIG. 26 are arranged.

Figure 27D:
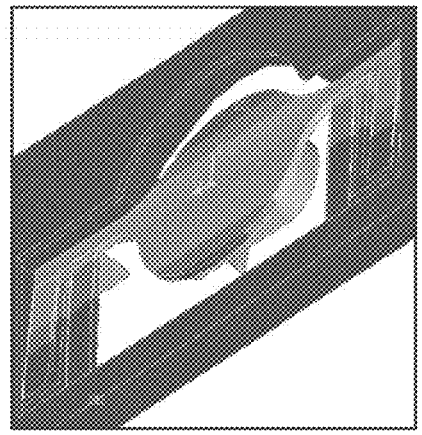
Figure 27E:
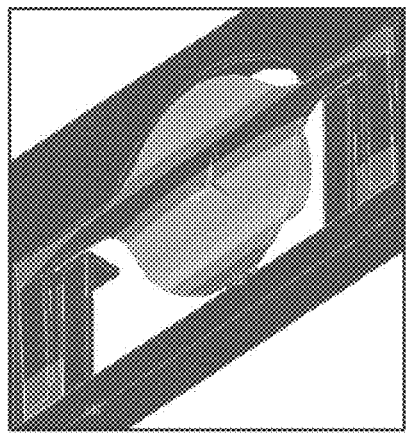
Figure 27F:
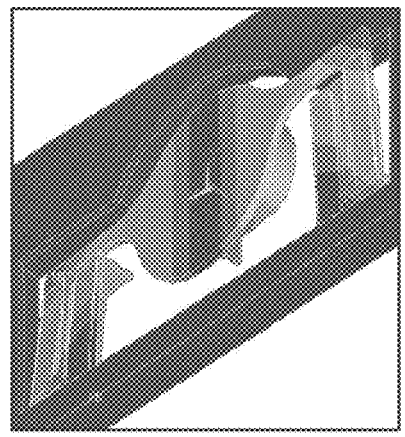

A mode 1 as illustrated in FIG. 27A and FIG. 27D is a mode dedicated to the bending of a pair of connecting parts, and a mode 2 as illustrated in FIG. 27B and FIG. 27E is a mode dedicated to the torsion stress of the torsion bars. A mode 3 as illustrated in FIG. 27C and FIG. 27F is a mode in which the phase of the bending of a connecting part on one side becomes opposite to the phase of the bending of a connecting part on the other side across the mirror unit.

The mirror resonance in the mode 2 that is by the torsion stress at the torsion bar is applied to the operation of the light deflector. For example, a light deflector with higher scanning performance can be achieved as the mirror resonance in the mode 2 is higher. In the mode 3, oscillation is caused in an direction perpendicular to the mirror resonance, and thus the track of laser beams causes Lissajous waveform. Such generation of Lissajous waveform is called Lissajous resonance. It can be considered that, as the Lissajous resonance in the mode 3 is higher, the solidity or rigidity at a connecting part is higher, and the twisting deformation does not easily occur at the connecting parts.

The values that are given on the right side of each mode in FIG. 27A to FIG. 27F indicate the resonance frequencies in the respective modes. When FIG. 27A to FIG. 27C are compared with FIG. 27D to FIG. 27F, it is understood that, in any one of the modes 1 to 3, the resonance frequency is greater in the configuration or structure in which a supporting layer is arranged on the rear side of either one of the connecting parts and the drive bars as illustrated in FIG. 26 than in the configuration or structure as illustrated in FIG. 13. In FIG. 27A to FIG. 27F, a supporting layer is formed on the rear side of the mirror unit. However, the effect is unchanged when a supporting layer is not formed on the rear side of the mirror unit, and the resonance frequency is greater in the configuration or structure in which a supporting layer is arranged on the rear side of either one of the connecting parts and the drive bars, as illustrated in FIG. 26, than in the configuration or structure as illustrated in FIG. 13.

Sixth Embodiment

In the sixth embodiment, connecting parts are arranged symmetrically in pairs across a predetermined line of symmetry. In the sixth embodiment, like reference signs are given to elements similar to those of the embodiments as described above, and overlapping description may be omitted.

Figure 28:
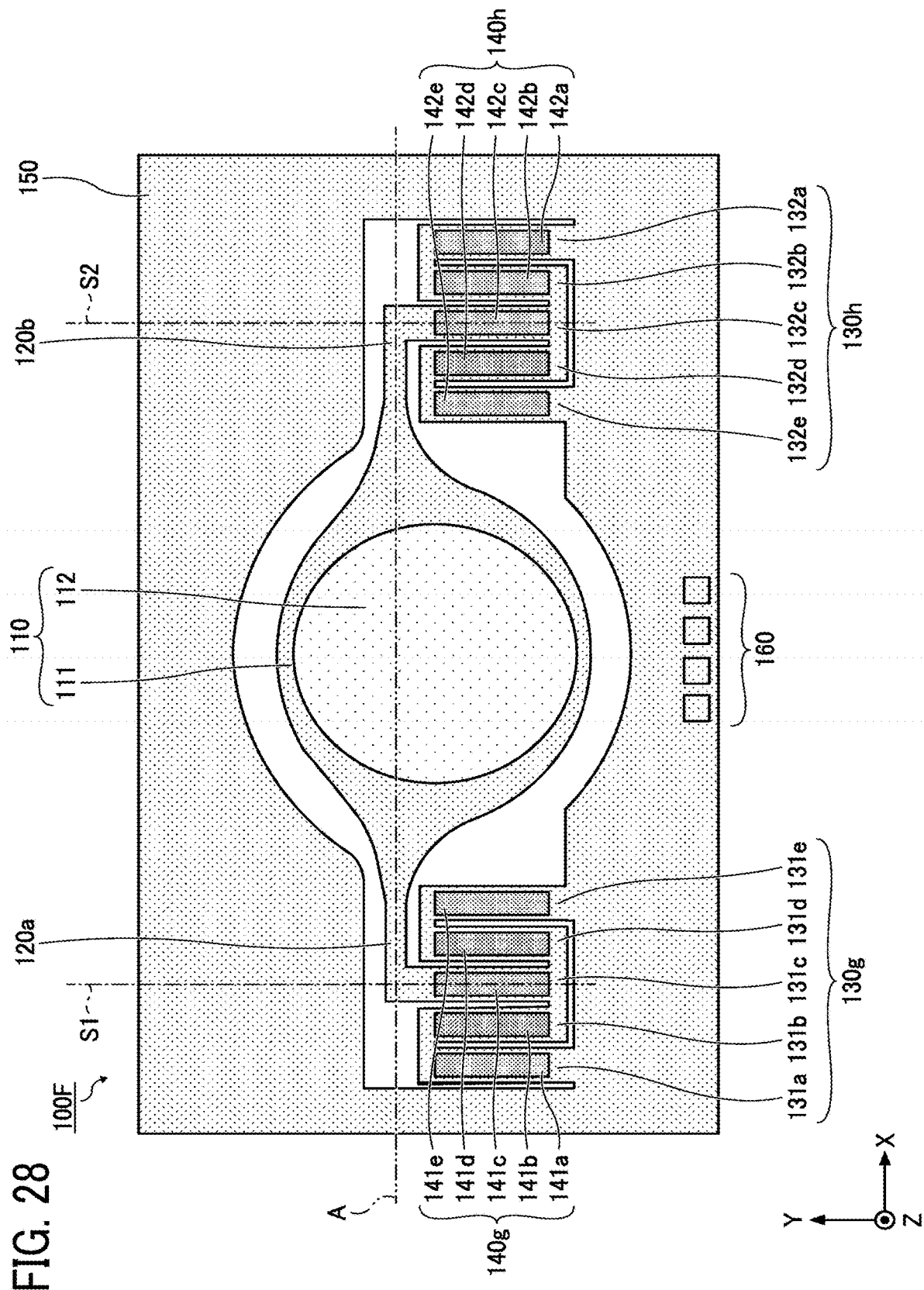
FIG. 28 is a front-side plan view of a light deflector according to a sixth embodiment of the present disclosure.

FIG. 28 is a plan view of a light deflector 100F according to the sixth embodiment of the present disclosure.

In FIG. 28, the light deflector 100F is viewed from the front side where the reflection plane can be observed.

Figure 29:
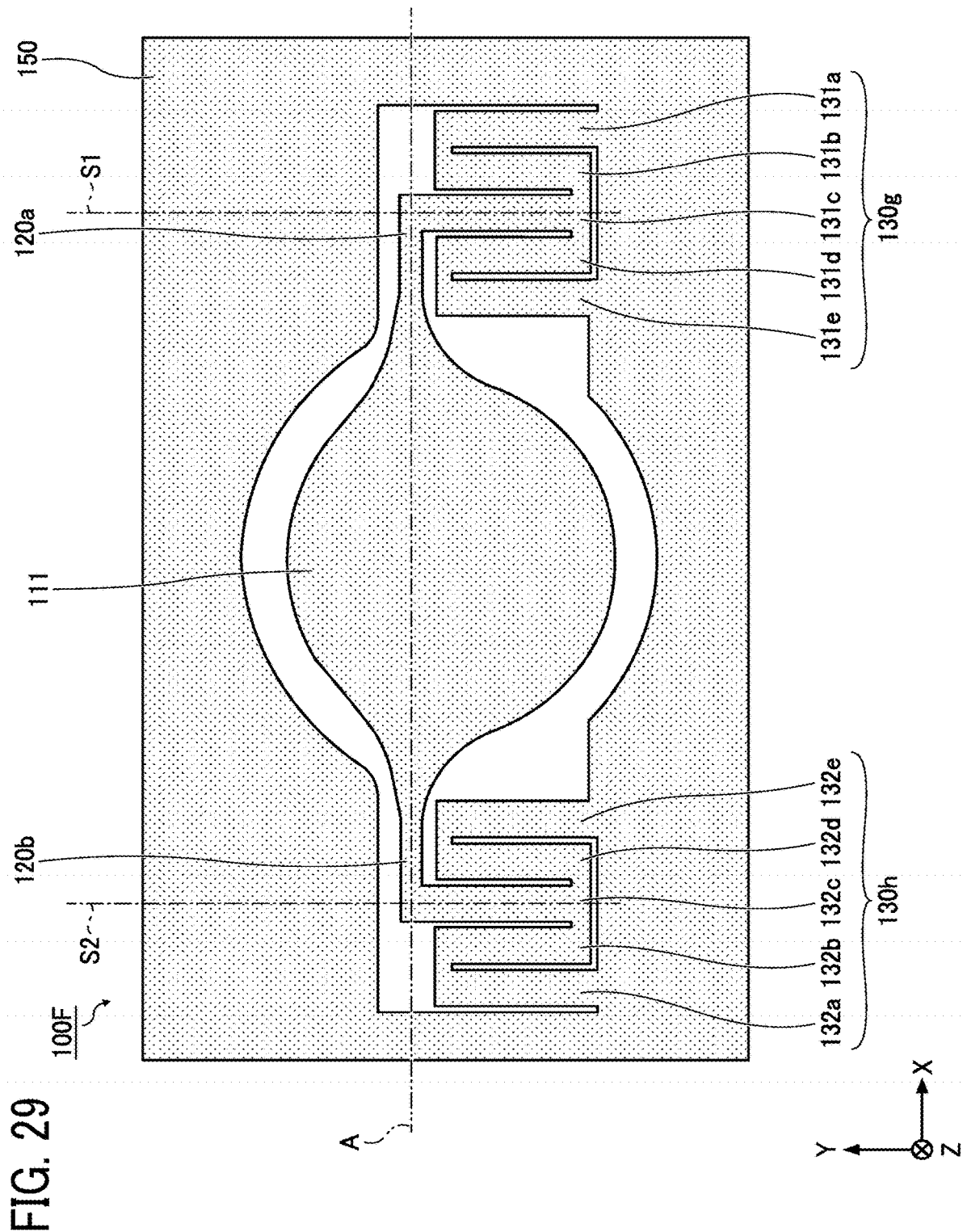
FIG. 29 is a rear-side plan view of a light deflector according to the sixth embodiment of the present disclosure.

FIG. 29 is a rear plan view of the light deflector 100F according to the sixth embodiment of the present disclosure.

The light deflector 100F as illustrated in FIG. 28 and FIG. 29 is different from the light deflector 100 (see FIG. 12 and FIG. 13) in the respect that the pair of connecting parts 130a and 130b are replaced with a pair of connecting parts 130g and 130h and that the pair of driving units 140a and 140b are replaced with a pair of driving units 140g and 140h.

The connecting part 130g includes strip-shaped drive bars 131a to 131e whose longer-side direction is in the direction perpendicular to the axis A (i.e., the direction parallel to the Y-axis), and a coupler that couples the multiple drive bars to each other to have a folded structure. In other words, the drive bars 131a to 131e are coupled to turn through a coupler to achieve a folded structure.

More specifically, the end of the drive bar 131a on the −Y side is coupled to an inner side of the fixed part 150, and the end of the drive bar 131a on the +Y side is coupled to the end of the drive bar 131b on the +Y side. The end of the drive bar 131b on the −Y side is coupled to the ends of the drive bars 131c and 131d on the −Y side. The end of the drive bar 131d on the +Y side is coupled to the end of the drive bar 131e on the +Y side. The end of the drive bar 131e on the −Y side is coupled to an inner side of the fixed part 150. Moreover, the end of the torsion bar 120a on the other side of the mirror-unit base 111 is coupled to the end of the drive bar 131c, which is positioned in the center of the five drive bars, on the +Y side.

In a similar manner to the above, the connecting part 130b includes strip-shaped drive bars 132a to 132e whose longer-side direction is in the direction perpendicular to the axis A (i.e., the direction parallel to the Y-axis), and a coupler that couples the multiple drive bars to each other to have a folded structure. In other words, the drive bars 132a to 132e are coupled to turn through a coupler to achieve a folded structure.

More specifically, the end of the drive bar 132a on the −Y side is coupled to an inner side of the fixed part 150, and the end of the drive bar 132a on the +Y side is coupled to the end of the drive bar 132b on the +Y side. The end of the drive bar 132b on the −Y side is coupled to the ends of the drive bars 132c and 132d on the −Y side. The end of the drive bar 132d on the +Y side is coupled to the end of the drive bar 132e on the +Y side. The end of the drive bar 132e on the −Y side is coupled to an inner side of the fixed part 150. Moreover, the end of the torsion bar 120b on the other side of the mirror-unit base 111 is coupled to the end of the drive bar 132c, which is positioned in the center of the five drive bars, on the +Y side.

The driving unit 140g is formed on the front side of the connecting part 130b, and such a configuration establishes a unimorph structure. The driving unit 140h is formed on the front side of the connecting part 130h, and such a configuration establishes a unimorph structure. The driving units 140g and 140h deform the pair of connecting parts 130g and 130h such that the mirror unit 110 oscillate.

The driving unit 140g includes a plurality of strip-shaped driving elements 141a to 141e whose longer-side direction is in the direction perpendicular to the axis A (i.e., the direction parallel to the Y-axis). The driving element 141a is formed on the front side of the drive bar 131a, and the driving element 141b is formed on the front side of the drive bar 131b. In a similar manner, the driving element 141c is formed on the front side of the drive bar 131c. The driving element 141d is formed on the front side of the drive bar 131d, and the driving element 141e is formed on the front side of the drive bar 131e. In other words, a driving element is arranged over each one of the turning portions of the connecting part 130g that has a folded structure. Each one of the driving elements 141a to 141e is a piezoelectric element.

In a similar manner to the above, the driving unit 140h includes a plurality of strip-shaped driving elements 142a to 142h whose longer-side direction is in the direction perpendicular to the axis A (i.e., the direction parallel to the Y-axis). The driving element 142a is formed on the front side of the drive bar 132a, and the driving element 142b is formed on the front side of the drive bar 132b. In a similar manner, the driving element 142c is formed on the front side of the drive bar 132c. The driving element 142d is formed on the front side of the drive bar 132d, and the driving element 142e is formed on the front side of the drive bar 132e. In other words, a driving element is arranged over each one of the turning portions of the connecting part 130h that has a folded structure. Each one of the driving elements 142a to 142e is a piezoelectric element.

In FIG. 28, a line of symmetry S1 is a straight line that passes through the center of the drive bar 131c and is parallel to the Y-axis, and divides the drive bar 131c into approximately equal halves in the longer-side direction. In a similar manner, a line of symmetry S2 is a straight line that passes through the center of the drive bar 132c and is parallel to the Y-axis, and divides the drive bar 132c into approximately equal halves in the longer-side direction. In the light deflector 100F, the shape of the drive bars 131a and 131b and the shape of the drive bars 131d and 131e are symmetrical across the line of symmetry in a direction approximately parallel to the longer-side direction of the drive bar 131c. In other words, the connecting part 130g is arranged symmetrically in pairs across the line of symmetry S1, and the line of symmetry S1 passes through the connecting part of the drive bar 131c and the torsion bar 120a. In a similar manner, the shape of the drive bars 132a and 132b and the shape of the drive bars 132d and 132e are symmetrical across the line of symmetry in a direction approximately parallel to the longer-side direction of the drive bar 132c. In other words, the connecting part 130h is arranged symmetrically in pairs across a line of symmetry S2, and the line of symmetry S2 passes through the connecting portion of the drive bar 132c and the torsion bar 120b.

Once voltage is applied to the multiple driving elements and the drive bars drive the pair of torsion bars that hold the mirror unit, the drive bars bend and deform, and unwanted twisting deformation occurs between the pair of connecting parts 130g and 130h of a meandering structure. As described above, a pair of drive bars are symmetrically arranged on both sides of the connecting portion of a drive bar and a torsion bar. Due to such a configuration, twisting deformation is controlled, and the pair of connecting parts 130g and 130h of a meandering structure can be prevented from being damaged.

In a similar manner to the above, as a pair of drive bars are symmetrically arranged on both sides of the connecting portion of a drive bar and a torsion bar, the solidity or rigidity of the pair of connecting parts 130g and 130h of a meandering structure increases. As a result, the resonance frequency of the mirror unit 110 can be increased without difficulty. Further, as the number of drive bars that are provided with driving elements increases, driving force increases. As a result, the level of operation sensitivity at the mirror unit 110 can be improved.

Seventh Embodiment

In a seventh embodiment of the present disclosure, other cases in which only one driver channel is used are described. In the seventh embodiment, like reference signs are given to elements similar to those of the embodiments as described above, and overlapping description may be omitted.

Figure 30:
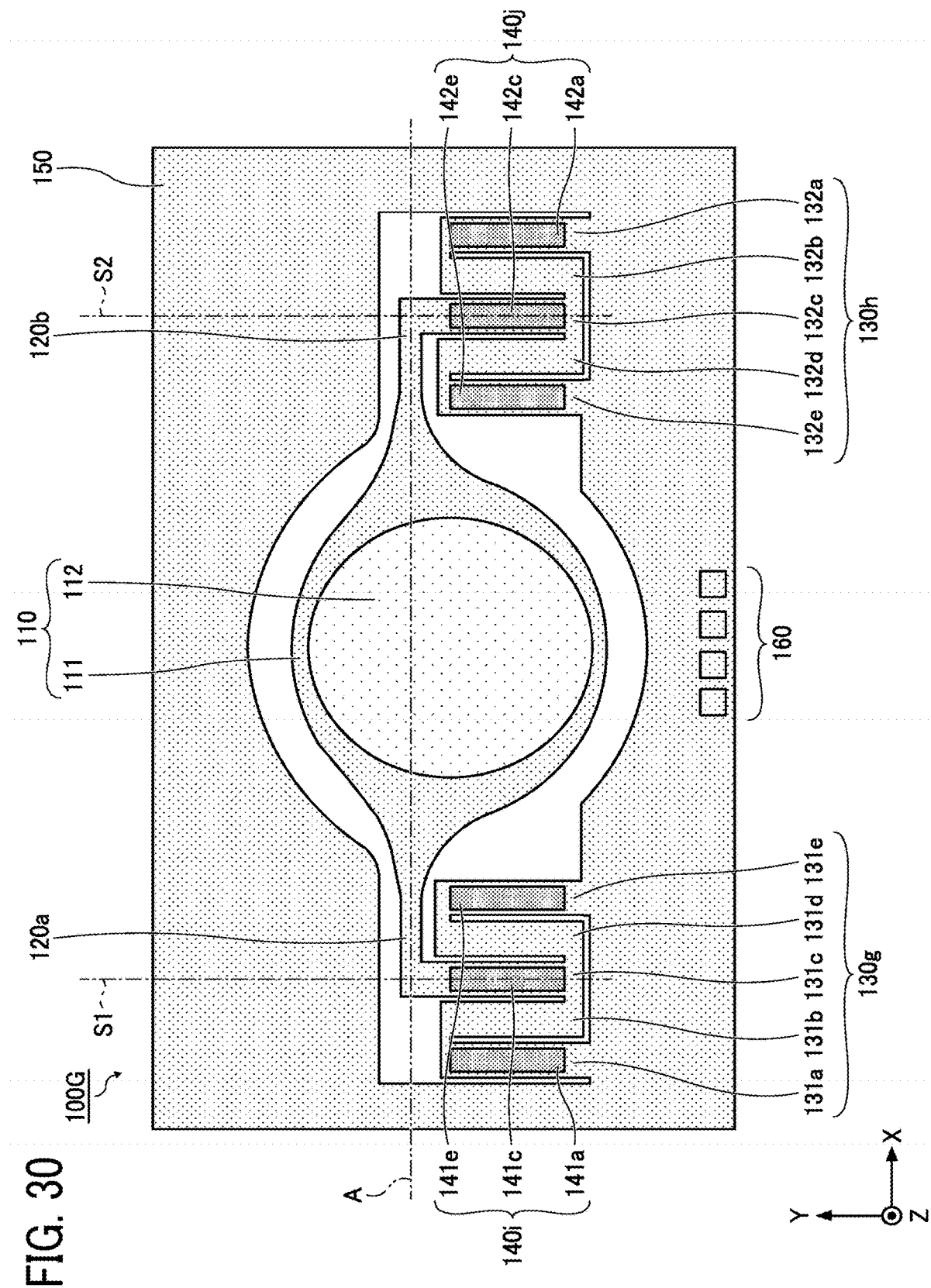
FIG. 30 is a front-side plan view of a light deflector according to a seventh embodiment of the present disclosure.

FIG. 30 is a front plan view of a light deflector 100G according to the seventh embodiment of the present disclosure.

FIG. 31 is a rear plan view of a light deflector 100G according to the seventh embodiment of the present disclosure.

The light deflector 100G as illustrated in FIG. 30 and FIG. 31 is different from the light deflector 100F (see FIG. 28 and FIG. 29) in the respect that the pair of driving units 140a and 140b are replaced with a pair of driving units 140i and 140j.

The driving unit 140i includes the driving elements 141a, 141c, and 141e but does not include the driving elements 141b and 141d. In other words, the driving element 141a is formed for the drive bar 131a that is the first drive bar among a plurality of drive bars when counted from the fixed part 150 side, and the driving element 141c is formed for the drive bar 131c that is the third drive bar among a plurality of drive bars when counted from the fixed part 150 side. Moreover, the driving element 141e is formed for the drive bar 131e that is the fifth drive bar among a plurality of drive bars when counted from the fixed part 150 side. However, no driving element is formed for the drive bars 131b and 131d that are the second and fourth drive bars among a plurality of drive bars when counted from the fixed part 150 side.

In a similar manner to the above, the driving unit 140j includes the driving elements 142a, 142c, and 142e but does not include the driving elements 142b and 142d. In other words, the driving element 142a is formed for the drive bar 132a that is the first drive bar among three drive bars when counted from the fixed part 150 side, and the driving element 142c is formed for the drive bar 132c that is the third drive bar among a plurality of drive bars when counted from the fixed part 150 side. Moreover, the driving element 142e is formed for the drive bar 132e that is the fifth drive bar among a plurality of drive bars when counted from the fixed part 150 side. However, no driving element is formed for the drive bars 132b and 132d that are the second and fourth drive bars among a plurality of drive bars when counted from the fixed part 150 side.

In the light deflector 100G, when voltage is applied to all the driving elements, each of the drive bars can deform and bend backward only to a one side. However, the mirror unit 110 can oscillate to both sides due to a resonant operation.

As described above, due to a resonant operation, the mirror unit 110 can operate to both sides by making use of the deformation to only one side. Accordingly, a driving element may be provided only for at least one odd-numbered drive bar of the folded structure among a plurality of drive bars when counted from the fixed part 150 side, and the mirror unit 110 can oscillate by making use of the deformation to only one side. In such a configuration, it is satisfactory as long as the driving elements are supplied with voltage only from a single channel. Accordingly, it is satisfactory as long as a driver is provided for only one channel, and the driver of the light deflector 100G can be produced at low cost. In cases where a driving element is formed only for at least one even-numbered drive bar among a plurality of drive bars when counted from the fixed part 150 side, similar advantageous effects can be achieved.

The resonance frequency in a bending mode for the connecting part tends to be higher when the second and fourth drive bars are not deformed. In order to handle such a situation, in the light deflector 1000, as illustrated in FIG. 31, two drive-bar supporting layers that are arranged on the rear side of the second and fourth drive bars in the driving unit 140*i*, respectively, are connected to a coupler supporting layer that is arranged on the rear side of the coupler to couple the adjacent drive bars to each other. As a result, a single continuous supporting layer 151*e* is formed. In a similar manner, two drive-bar supporting layers that are arranged on the rear side of the second and fourth drive bars in the driving unit 140*j*, respectively, are connected to a coupler supporting layer that is arranged on the rear side of the coupler to couple the adjacent drive bars to each other. As a result, a single continuous supporting layer 152*e* is formed. For example, the pair of supporting layers 151*e* and 152*e* are made of a silicon supporting layer.

As a single continuous supporting layer 151*e* and a single continuous supporting layer 152*e* are arranged on the rear side of the drive bar and the rear side of the coupler, the twisting deformation of the pair of connecting parts 130*g* and 130*h* of a meandering structure can efficiently be controlled, and the pair of connecting parts 130*g* and 130*h* can be prevented from being damaged. As a result, the degree of breaking-limit angle can further be increased, and the amplitude of the mirror unit 110 can further be increased accordingly. Moreover, the resonance frequency of the mirror unit 110 can be increased. As the second and fourth drive bars have no influence on the deformation, the width of the second and fourth drive bars may be made narrower than the width of the other drive bars that influence the operation so as to be beneficial in downsizing.

Figure 32A:
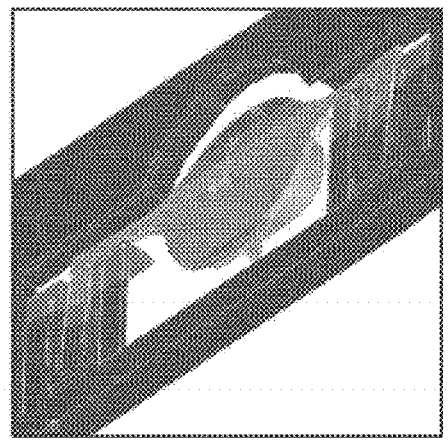
FIG. 32A to FIG. 32C are diagrams each illustrating a result of simulation indicative of the effect of a supporting layer, according to the seventh embodiment of the present disclosure.
Figure 32B:
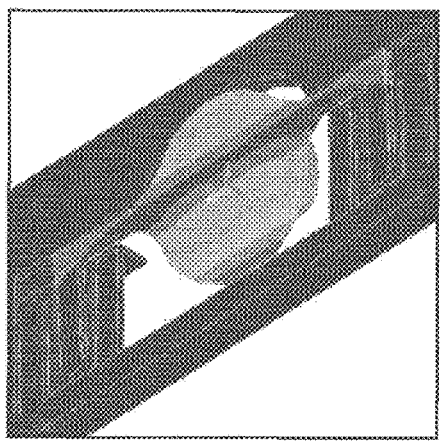
Figure 32C:
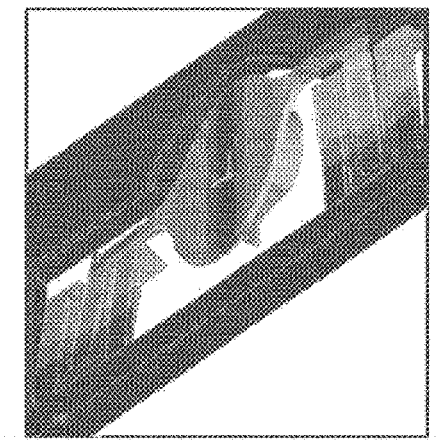

FIG. 32A to FIG. 32C are diagrams each illustrating a result of simulation indicative of the effect of a supporting layer, according to the seventh embodiment of the present disclosure.

In FIG. 32A to FIG. 32C, results of simulation of three major modes are illustrated when the supporting layers 151*e* and 152*e* as illustrated in FIG. 31 are arranged.

The values that are given on the right side of each mode in FIG. 32A to FIG. 32C indicate the resonance frequencies in the respective modes. When FIG. 32A to FIG. 32C are compared with FIG. 27D to FIG. 27F, it is understood that the resonance frequency is greater in the configuration or structure as illustrated in FIG. 31 than in the configuration or structure as illustrated in FIG. 26 in any one of the modes 1 to 3. In the seventh embodiment of the present disclosure as illustrated in FIG. 31, a supporting layer is formed on the rear side of the mirror unit. However, the effect is unchanged when a supporting layer is not formed on the rear side of the mirror unit, and the resonance frequency is greater in the configuration or structure as illustrated in FIG. 31 than in the configuration or structure as illustrated in FIG. 26.

In cases where a driving element is formed only for at least one even-numbered drive bar among a plurality of drive bars when counted from the fixed part 150 side, it is satisfactory as long as a drive-bar supporting layer is provided for at least one odd-numbered drive bar among a plurality of drive bars when counted from the fixed part 150 side.

In the embodiments of the present disclosure as described above, for example, a piezoelectric system in which a piezoelectric element is used as a driver that drives a movable part to oscillate is adopted. However, no limitation is intended thereby, and for example, an electrostatic system in which electrostatic force is used to operate and an electromagnetic system in which electromagnetic force is used to operate may be adopted. In the fourth embodiment, the same drive system is adopted for a driver that drives a movable part to oscillate in the main scanning direction and a driver that drives a movable part to oscillate in the sub-scanning direction. However, no limitation is indicated thereby, and a different kind of drive system may be adopted for each of the driver that drives a movable part to oscillate in the main scanning direction and the driver that drives a movable part to oscillate in the sub-scanning direction.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. A light deflector comprising:
a fixed part;
a movable part including a reflection plane;
a pair of elastic supports to support the movable part;
a pair of connecting parts disposed at a position where a straight line connecting a pair of center points of the pair of connecting parts and a central axis of the pair of elastic supports do not overlap, the pair of connecting parts connected between the pair of elastic supports and the fixed part, the pair of connecting parts being supported by the fixed part in a cantilevered state, each one of the pair of connecting parts having a folded structure; and
driving circuitry configured to deform the pair of connecting parts to make the movable part oscillate,
wherein:
the pair of connecting parts includes a plurality of drive bars, and
a distance between the movable part and the drive bars connected to the pair of elastic supports is longer than a distance between the movable part and the drive bars connected to the fixed part.

2. The light deflector according to claim 1, wherein the pair of connecting parts further includes:
a coupler to couple the plurality of drive bars to each other to have a folded structure, and
wherein each one of the plurality of drive bars has a longer-side direction in a direction perpendicular to the central axis of the pair of elastic supports.

3. The light deflector according to claim 2, further comprising a coupler supporting layer for the coupler.

4. The light deflector according to claim 2, further comprising a driving element for at least one odd-numbered drive bar among the plurality of drive bars when counted from a side of the fixed part or at least one even-numbered drive bar among the plurality of drive bars when counted from the side of the fixed part.

5. The light deflector according to claim 4, further comprising a drive-bar supporting layer for at least one of the plurality of drive bars for which the driving element is not provided.

6. The light deflector according to claim 5, wherein the drive-bar supporting layer has a width approximately same as a width of each one of the plurality of drive bars.

7. The light deflector according to claim 5, wherein the drive-bar supporting layer has a width narrower than a width of each one of the plurality of drive bars.

8. The light deflector according to claim 5, further comprising a coupler supporting layer for the coupler,
wherein the coupler supporting layer is continuous to the drive-bar supporting layer.

9. The light deflector according to claim 5, further comprising a coupler supporting layer for the coupler,
wherein the coupler supporting layer is not continuous to the drive-bar supporting layer.

10. The light deflector according to claim 1, wherein the pair of connecting parts includes:
a first drive bar coupled to the pair of elastic supports,
a second drive bar coupled to the first drive bar and the fixed part at one end and another end, respectively, and
a third drive bar coupled to the first drive bar and the fixed part at one end and another end, respectively, and
wherein a shape of the second drive bar and a shape of the third drive bar are symmetrical across a line of symmetry in a direction approximately parallel to a longer-side direction of the first drive bar.

11. The light deflector according to claim 1, wherein a resonance frequency at the pair of connecting parts in a primary bending and deforming mode is set within a frequency range exciting a resonance of the movable part in a torsion-stress deformation mode of the pair of elastic supports.

12. The light deflector according to claim 1,
further comprising a plurality of driving elements for the driving circuitry,
wherein at least one even-numbered driving element among the plurality of driving elements when counted from a side of the fixed part is coupled to a first electrode, and
wherein at least one odd-numbered driving element among the plurality of driving elements when counted from the side of the fixed part is coupled to a second electrode.

13. The light deflector according to claim 12, wherein the movable part oscillates when voltage is alternately applied to the first electrode and the second electrode.

14. The light deflector according to claim 1, further comprising:
a second fixed part that is arranged in an outer region of the fixed part,
a pair of second connecting parts to couples the fixed part to the second fixed part, and
second driving circuitry to deform the pair of second connecting parts,
wherein the driving circuitry deforms the pair of connecting parts to make the movable part oscillate around the central axis of the pair of elastic supports, and
wherein the second driving circuitry deforms the pair of second connecting parts to make the movable part oscillate around an axis perpendicular to the central axis of the pair of elastic supports.

15. An optical scanning system comprising
a light deflector comprising:
a fixed part;
a movable part including a reflection plane;
a pair of elastic supports to support the movable part;
a pair of connecting parts disposed at a position where a straight line connecting a pair of center points of the pair of connecting parts and a central axis of the pair of elastic supports do not overlap, the pair of connecting parts connected between the pair of elastic supports and the fixed part, the pair of connecting parts being supported by the fixed part in a cantilevered state, each one of the pair of connecting parts having a folded structure; and
driving circuitry configured to deform the pair of connecting parts to make the movable part oscillate,
wherein:
the pair of connecting parts includes a plurality of drive bars, and
a distance between the movable part and the drive bars connected to the pair of elastic supports is longer than a distance between the movable part and the drive bars connected to the fixed part.

16. An image projection device comprising:
a light deflector comprising:
a fixed part;
a movable part including a reflection plane;
a pair of elastic supports to support the movable part;
a pair of connecting parts disposed at a position where a straight line connecting a pair of center points of the pair of connecting parts and a central axis of the pair of elastic supports do not overlap, the pair of connecting parts connected between the pair of elastic supports and the fixed part, the pair of connecting parts being supported by the fixed part in a cantilevered state, each one of the pair of connecting parts having a folded structure; and
driving circuitry configured to deform the pair of connecting parts to make the movable part oscillate,
wherein:
the pair of connecting parts includes a plurality of drive bars, and
a distance between the movable part and the drive bars connected to the pair of elastic supports is longer than a distance between the movable part and the drive bars connected to the fixed part.

17. An image forming apparatus comprising the optical scanning system according to claim 15.

18. A laser imaging detection and ranging device comprising the light deflector according to claim 1.

19. The light deflector according to claim 1, wherein:
the pair of connecting parts are disposed on one side only relative to a rotation axis of the movable part.

* * * * *